(12) United States Patent
Yeh et al.

(10) Patent No.: US 8,810,760 B2
(45) Date of Patent: Aug. 19, 2014

(54) LIQUID CRYSTAL DISPLAY PANEL

(75) Inventors: Chao-Wei Yeh, Taoyuan County (TW);
Chien-Huang Liao, Hsinchu (TW);
Wen-Hao Hsu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 496 days.

(21) Appl. No.: 13/167,731

(22) Filed: Jun. 24, 2011

(65) Prior Publication Data

US 2012/0281174 A1    Nov. 8, 2012

(30) Foreign Application Priority Data

May 4, 2011 (TW) .............................. 100115621 A

(51) Int. Cl.
*G02F 1/1337* (2006.01)
*G02F 1/1343* (2006.01)
*G02F 1/133* (2006.01)
*G02F 1/13* (2006.01)

(52) U.S. Cl.
CPC .......... *G02F 1/133* (2013.01); *G09G 2320/068* (2013.01); *G02F 1/134336* (2013.01); *G02F 1/1337* (2013.01); *G02F 1/1343* (2013.01); *G09G 2358/00* (2013.01); *G02F 2001/134345* (2013.01); *G09G 2300/0447* (2013.01); *G02F 1/1323* (2013.01)
USPC ......................................................... 349/129

(58) Field of Classification Search
None
See application file for complete search history.

(56) References Cited

U.S. PATENT DOCUMENTS

| | | | |
|---|---|---|---|
| 6,445,434 B2 * | 9/2002 | Takato et al. ................. | 349/123 |
| 8,194,016 B2 * | 6/2012 | Yoshiga et al. ................ | 345/87 |
| 2005/0286000 A1 | 12/2005 | Tsai et al. | |
| 2009/0086142 A1 * | 4/2009 | Chen et al. .................... | 349/129 |

* cited by examiner

*Primary Examiner* — Sarah Hahm
(74) *Attorney, Agent, or Firm* — Jianq Chyun IP Office

(57) ABSTRACT

A liquid crystal display (LCD) panel is provided. A pixel structure of the LCD panel has an asymmetrical liquid crystal alignment. The LCD panel is divided into an array of display blocks. When the LCD panel is in a narrow viewing angle display mode, some of the display blocks are disabled or darkened so that a displayed image is interfered by the disabled or darkened display blocks when it is viewed from the side. Thereby, an anti-peep effect is achieved.

40 Claims, 22 Drawing Sheets

First pixel electrode area

Second pixel electrode area

First region

Second region

Azimuthal angle 90°

Azimuthal angle 45°

Front view

Azimuthal angle 0°

Azimuthal angle 270°

Azimuthal angle 315°

LIQUID CRYSTAL DISPLAY PANEL

CROSS-REFERENCE TO RELATED APPLICATION

This application claims the priority benefit of Taiwan application serial no. 100115621, filed on May 4, 2011. The entirety of the above-mentioned patent application is hereby incorporated by reference herein and made a part of this specification.

BACKGROUND OF THE DISCLOSURE

1. Field of the Disclosure

The disclosure generally relates to a liquid crystal display (LCD) panel, and more particularly, to a LCD panel offering an anti-peep effect.

2. Description of Related Art

A display usually offers a wide viewing angle display effect in order to allow multiple viewers to view the displayed images. However, in some cases (for example, when confidential information is read or a password is input), the wide viewing angle display effect may cause confidential information to be peeped by others and accordingly leak of the confidential information. Thus, in order to satisfy both requirements mentioned above, displays switchable between a wide viewing angle display mode and a narrow viewing angle display mode have become one of the mainstream products in the display market.

Following anti-peep mechanisms are usually adopted by conventional displays.

The first conventional anti-peep mechanism is to directly attach an anti-peep film to the exterior surface of a display panel.

An anti-peep film provides a privacy protection effect by inhibiting the brightness at large viewing angles so that a viewer from the side cannot read the displayed information clearly. This technique is very straightforward and requires easily accessed material. However, because an additional optical film is used, the front view optical characteristic and display quality of the display panel are affected. Besides, this technique brings inconvenience to the user as the anti-peep film has to be manually attached and removed.

The second conventional anti-peep mechanism is to control the backlight source.

In this technique, a backlight source which can emit highly collimated light and a voltage-controlled diffuser (for example, a polymer dispersed liquid crystal (PDLC) film) are adopted. When the voltage is turned off, the voltage-controlled diffuser diffuses the collimated light to emit light to the side, so that a wide viewing angle display mode is achieved. On the other hand, when the voltage is turned on, the voltage-controlled diffuser does not diffuse the collimated light, so that a narrow viewing angle display mode is achieved. This technique is to adjust the brightness at large viewing angles, so as to prevent the displayed information from being read from the side, by controlling the backlight emission angle. Theoretically, this technique offers a good anti-peep effect and allows the user to switch between the two display modes conveniently. However, in an actual application, it is impossible to obtain a completely collimated light due to the difficulty in optical path control. Even though this technique can reduce the distribution of backlight at large viewing angles, it cannot reduce the brightness at the large viewing angles to an unrecognizable extent. Thus, this technique does not provide a satisfying anti-peep effect.

The third conventional anti-peep mechanism is to adopt a viewing angle control module.

In this technique, a viewing angle control module (panel) is further disposed in a normal display module (display panel). A wide viewing angle display mode and a narrow viewing angle display mode are switched by controlling the on and off of the viewing angle control module with a voltage supply. In the wide viewing angle display mode, the image display is not affected and accordingly the original image display quality can be retained. While in the narrow viewing angle display mode, the brightness at large viewing angles is effectively inhibited so that the displayed information cannot be read from the side. However, because an additional module is adopted, the weight and thickness of the entire display are doubled, and the hardware cost thereof is also increased.

As described above, some of the original characteristics (for example, display quality, optical characteristics, thickness, and weight, etc) of a display will be sacrificed by adopting any one of aforementioned conventional anti-peep mechanisms. Thereby, an improved anti-peep technique is desired.

SUMMARY OF THE DISCLOSURE

Accordingly, the disclosure is directed to a liquid crystal display (LCD) panel which offers both an anti-peep effect and an optimal display quality.

The disclosure is directed to a LCD panel, wherein the pixel structure of the LCD panel is designed so that both an anti-peep effect and an optimal display quality can be achieved without designing interference pixels by sacrificing the aperture ratio, adopting any additional viewing angle control module (panel), or greatly altering the pixel fabrication process.

The disclosure provides a LCD panel including at least one first region and at least one second region. The first region and the second region respectively have a plurality of sub-pixels. Each of the sub-pixels includes at least one first pixel electrode area and at least one second pixel electrode area. The first pixel electrode area is divided by a first horizontal datum line and a first vertical datum line into a plurality of first alignment sub-areas. Each of the first alignment sub-areas has a liquid crystal alignment, and the liquid crystal alignments of the first alignment sub-areas are different from each other. The second pixel electrode area is divided by a second horizontal datum line and a second vertical datum line into a plurality of second alignment sub-areas. Each of the second alignment sub-areas has a liquid crystal alignment, and the liquid crystal alignments of the second alignment sub-areas are different from each other. The second horizontal datum line divides the second pixel electrode area into a third alignment area and a fourth alignment area having different sizes. When the LCD panel is in a narrow viewing angle display mode, a driving voltage of the first pixel electrode areas within the first region is lower than driving voltages of the second pixel electrode areas within the first region and the first pixel electrode areas and the second pixel electrode areas within the second region, and the driving voltage of the second pixel electrode areas within the first region when a first front view luminosity is displayed is substantially higher than the driving voltage of the first pixel electrode areas and the second pixel electrode areas within the second region when the first front view luminosity is displayed.

The disclosure provides a LCD panel having a plurality of sub-pixels. Each of the sub-pixels includes at least a first pixel electrode area and a second pixel electrode area. The second pixel electrode area has at least one liquid crystal alignment direction, and a sum quantity of the liquid crystal alignment direction causes the luminous flux in an upper half viewing angle direction to be different from the luminous flux in a lower half viewing angle direction. Besides, a driving voltage of the first pixel electrode areas is lower than a driving voltage of the second pixel electrode areas.

The disclosure provides a LCD panel including at least one first region and at least one second region. The first region and the second region respectively have a plurality of sub-pixels. Each of the sub-pixels includes at least a first pixel electrode area and a second pixel electrode area. The first pixel electrode area or the second pixel electrode area has at least one liquid crystal alignment direction, and a sum quantity of the liquid crystal alignment direction causes the luminous flux in an upper half viewing angle direction to be different from the luminous flux in a lower half viewing angle direction. When the LCD panel is in a narrow viewing angle display mode, a driving voltage of the first pixel electrode areas within the first region when a first front view luminosity is displayed is substantially lower than driving voltages of the second pixel electrode areas within the first region and the first pixel electrode areas and the second pixel electrode areas within the second region when the first front view luminosity is displayed, and the driving voltage of the second pixel electrode areas within the first region when the first front view luminosity is displayed is substantially higher than the driving voltages of the first pixel electrode areas and the second pixel electrode areas within the second region when the first front view luminosity is displayed.

These and other exemplary embodiments, features, aspects, and advantages of the disclosure will be described and become more apparent from the detailed description of exemplary embodiments when read in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
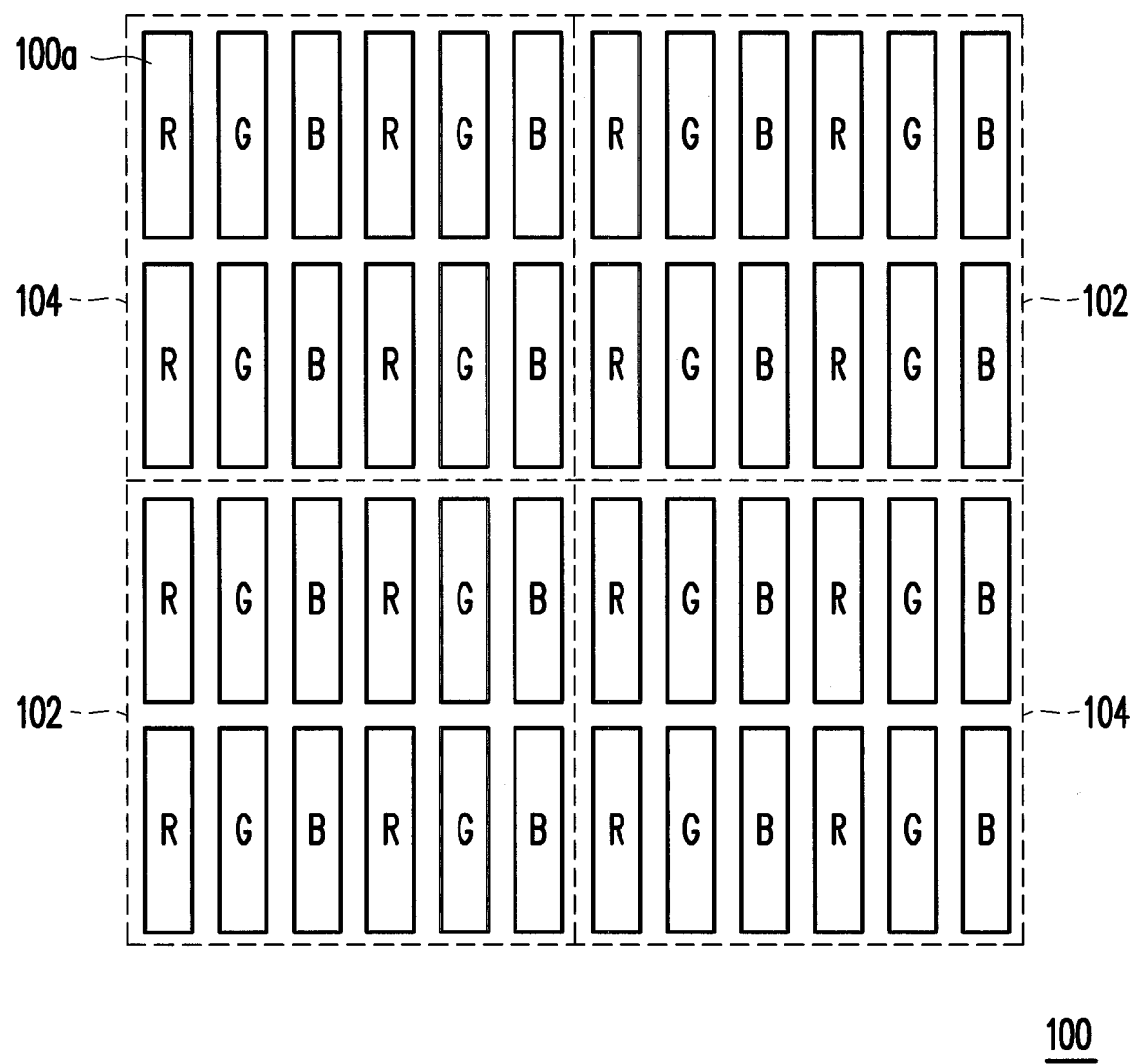
FIG. 1 illustrates a part of the display area on a liquid crystal display (LCD) panel according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

In a liquid crystal display (LCD) panel provided by the disclosure, each sub-pixel is divided into a first pixel electrode area and a second pixel electrode area. Each pixel electrode area is given an asymmetric viewing angle characteristic, but the two pixel electrode areas are mirror symmetric to each other along a predetermined axis. Thus, when the LCD panel is in a wide viewing angle display mode, both the first pixel electrode area and the second pixel electrode area of each sub-pixel contribute luminosity. Thus, when the first pixel electrode areas and the second pixel electrode areas are all enabled, the LCD panel offer the same symmetric pixel characteristic as a regular display, and accordingly, a user can view a displayed image clearly from any viewing angle.

When the LCD panel is switched to a narrow viewing angle display mode, the LCD panel is divided into a plurality of regions, and different driving voltages are supplied to the first pixel electrode areas and the second pixel electrode areas within these regions, so that an asymmetric viewing angle characteristic is achieved in some specific regions. Besides, different driving voltages are supplied to adjacent regions, but the front view luminosity (or namely gamma) of these regions are maintained the same. Accordingly, different regions have the same front view performance but different asymmetric viewing angle characteristic from side viewing angles. Thereby, due to the difference of viewing angle asymmetry between different regions, the brightness contrast at side viewing angles interferes a displayed image, and accordingly an anti-peep effect is achieved. On the other hand, the displayed image is not affected when it is viewed from the front since different regions contribute the same front view luminosity.

Generally speaking, the concept of the disclosure can be applied to any suitable display panel to achieve an anti-peep effect. Aforementioned anti-peep effect can be achieved by controlling the sum quantity along a liquid crystal alignment direction in the second pixel electrode areas, so as to make the luminous flux in an upper half viewing angle direction to be different from that in a lower half viewing angle direction, and by controlling the driving voltage of the first pixel electrode areas to be substantially lower than that of the second pixel electrode areas.

Additionally, in the disclosure, the same or different driving voltages may be supplied to the first pixel electrode areas and the second pixel electrode areas, wherein the problem of color washout at upper half viewing angles or lower half viewing angles in the wide viewing angle display mode can be resolved by supplying different driving voltages to the first pixel electrode areas and the second pixel electrode areas.

Moreover, because the asymmetric viewing angle distribution in the horizontal direction may cause parallax between adjacent regions and accordingly may cause dizziness in a viewer viewing from the front, according to the disclosure, an asymmetric viewing angle distribution may be produced on the LCD panel along the vertical direction (lengthways).

Furthermore, according to the disclosure, the front view luminosity distribution in the first pixel electrode areas and the second pixel electrode areas can be adjusted to resolve the problem of obvious bright and dark lines at the front viewing angle caused by boundary sub-pixels in adjacent regions without sacrificing the anti-peep effect at side viewing angles.

On the other hand, regarding the anti-peep capability in the horizontal direction, in the disclosure, the proportion between the driving voltages of the first pixel electrode areas and the second pixel electrode areas can be further adjusted to produce grayscale inversion in the grayscale and luminosity distribution at side viewing angles, so as to enhance the anti-peep effect.

Below, different aspects of the technique provided by the disclosure will be described in detail with reference to accompanying drawing. In order to make the luminous flux in the upper half viewing angle direction to be different from that in the lower half viewing angle direction, in following embodiments, the technique in the disclosure will be explained by taking a liquid crystal alignment design of a PSA panel as an example. However, in the disclosure, besides adjusting the liquid crystal alignment, different luminous flux may also be produced through other conventional techniques without departing the concept of the disclosure, so as to achieve an optimal anti-peep effect and a good display quality.

Figure 2A:
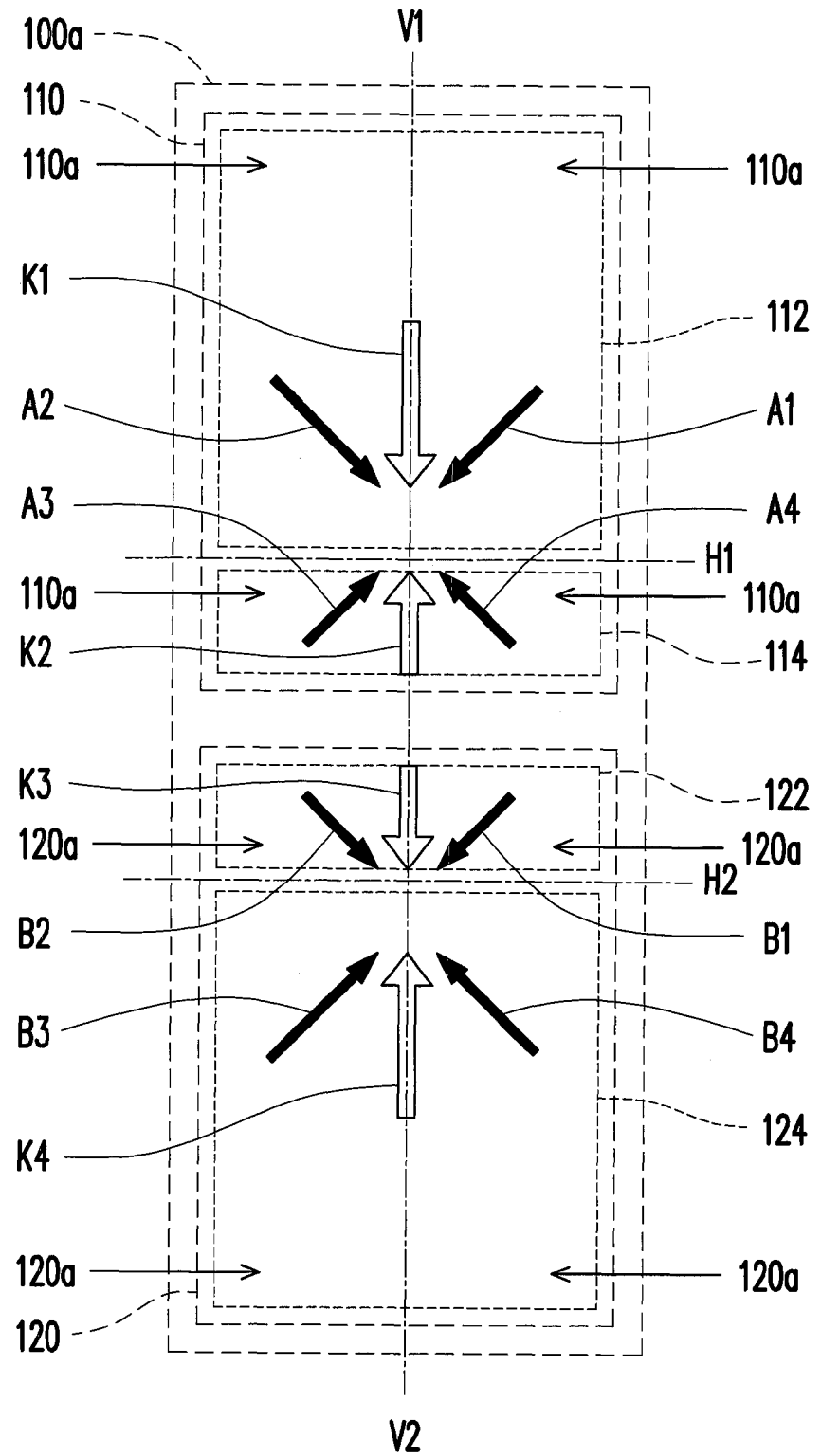
FIG. 2A is a diagram illustrating the liquid crystal distribution proportion in different regions of a sub-pixel of the LCD panel in FIG. 1.
Figure 2B:
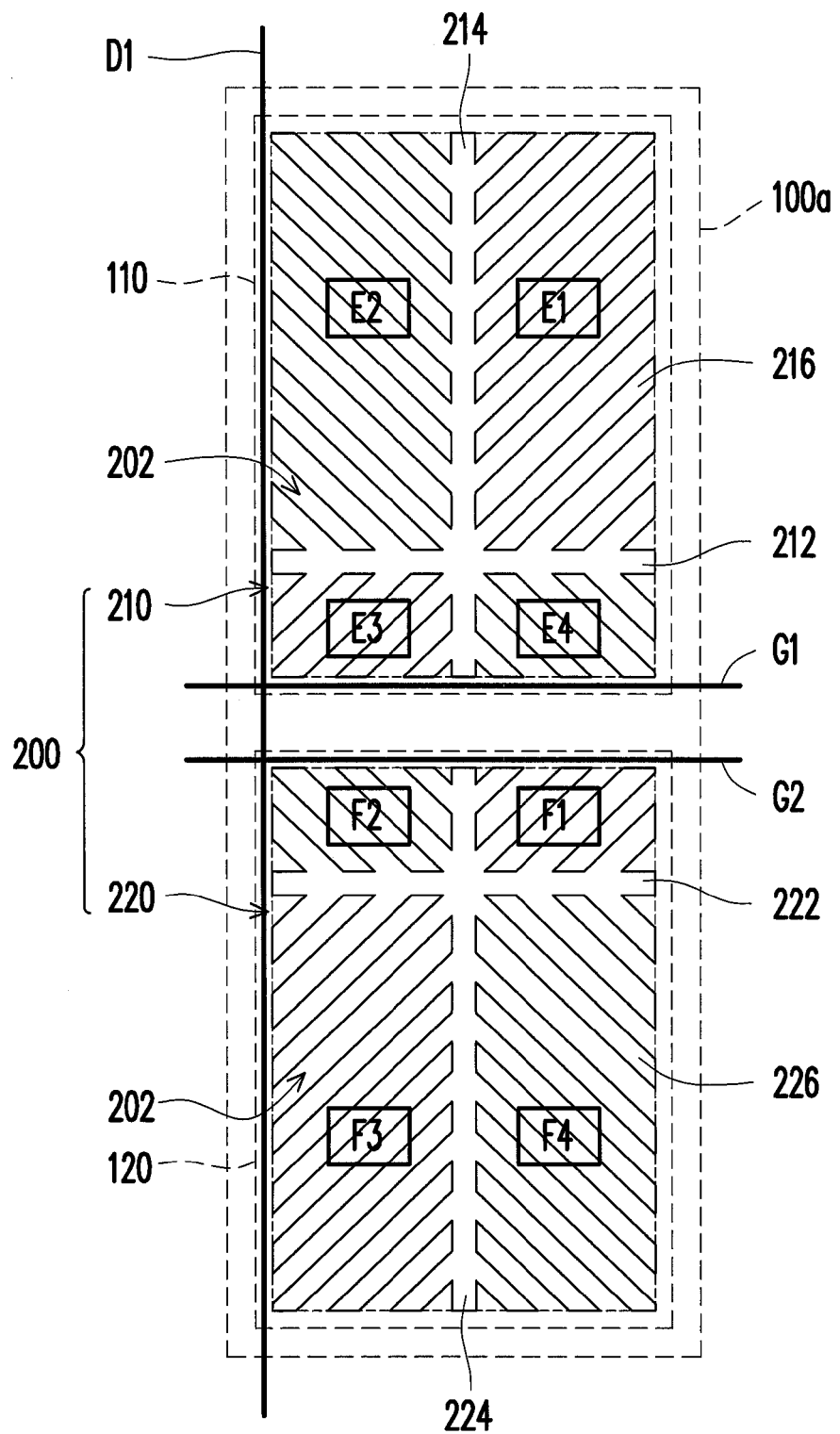
FIG. 2B illustrates a pixel structure of the sub-pixel in FIG. 2A.

Pixel Design and Optical Characteristic of a Liquid Crystal Alignment Asymmetrical in the Vertical Direction FIG. 1 illustrates a part of the display area on a liquid crystal display (LCD) panel according to an embodiment of the disclosure. FIG. 2A is a diagram illustrating the liquid crystal distribution proportion in different regions of a sub-pixel of the LCD panel in FIG. 1. FIG. 2B illustrates a pixel structure of the sub-pixel in FIG. 2A.

As shown in FIG. 1, FIG. 2A, and FIG. 2B, the LCD panel 100 is divided into at least one first region 102 and at least one second region 104. Two first regions 102 and two second regions 104 are illustrated in FIG. 1 as examples. Each of the first regions 102 and the second regions 104 is composed of a plurality of sub-pixels 100a. The sub-pixels 100a include red (R), green (G), and blue (B) sub-pixels. However, the colors of the sub-pixels 100a are not limited the colors or/and sub-pixel numbers. In other embodiments, the sub-pixels 100a may be of any color in the color palette, such as white, yellow, purple, and orange, and the sub-pixel numbers can be four, five, six, etc. Each sub-pixel 100a includes a first pixel electrode area 110 and a second pixel electrode area 120. The first pixel electrode area 110 is divided by a first horizontal datum line H1 and a first vertical datum line V1 into a plurality of first alignment sub-areas 110a, wherein the first alignment sub-areas 110a respectively have different liquid crystal alignments A1-A4. To be specific, in the present embodiment, the first vertical datum line V1 divides the first pixel electrode area 110 substantial equally. Ideally, the liquid crystal alignment of the first pixel electrode area 110 presents a mirror symmetry substantially along the first vertical datum line V1. Namely, the liquid crystal alignments A1 and A2 are mirror symmetric to each other substantially along the first vertical datum line V1, and the liquid crystal alignments A3 and A4 are mirror symmetric to each other substantially along the first vertical datum line V1. It should be noted that in other embodiments, the first vertical datum line V1 divides the first pixel electrode area 110 substantial equally, but the liquid crystal alignments A1 and A2 may not present a mirror symmetry substantially along the first vertical datum line V1 and the liquid crystal alignments A3 and A4 may not present a mirror symmetry substantially along the first vertical datum line V1 without departing the scope of the present embodiment. Additionally, in order to achieve an asymmetric viewing angle characteristic, preferably, the first horizontal datum line H1 divides the first pixel electrode area 110 into a first alignment area 112 and a second alignment area 114 having different sizes. However, the disclosure is not limited thereto, and in other embodiments, the first pixel electrode area 110 may also be divided into a first alignment area 112 and the second alignment area 114 having substantially the same area. Compared to the first pixel electrode area 110 divided into the first alignment area 112 and the second alignment area 114 having different sizes, the first pixel electrode area 110 divided into the first alignment area 112 and the second alignment area 114 having substantially the same area offers an acceptable asymmetric viewing angle effect.

The first alignment area 112 has a quantity K1 of a first alignment substantially along the first vertical datum line V1. The quantity K1 of the first alignment may be a sum quantity of the liquid crystal alignments A1 and A2 substantially along the first vertical datum line V1. The second alignment area 114 has a quantity K2 of a second alignment substantially along the first vertical datum line V1. The quantity K2 of the second alignment K2 may be a sum quantity of the liquid crystal alignments A3 and A4 substantially along the first vertical datum line V1. In the present embodiment, the quantity K1 of the first alignment is reverse to the quantity K2 of the second alignment, and the quantity K1 of the first alignment is substantially greater than the quantity K2 of the second alignment.

The second pixel electrode area 120 is divided by a second horizontal datum line H2 and a second vertical datum line V2 into a plurality of second alignment sub-areas 120a. The second alignment sub-areas 120*a* respectively have liquid crystal alignments B1-B4, and the liquid crystal alignments B1-B4 of the second alignment sub-areas 120*a* are different from each other. To be specific, in the present embodiment, the second vertical datum line V2 divides the second pixel electrode area 120 substantial equally so that the liquid crystal alignments B1-B4 of the second pixel electrode area 120 present a mirror symmetry substantially along the second vertical datum line V2. Namely, the liquid crystal alignments B1 and B2 present a mirror symmetry substantially along the second vertical datum line V2, and the liquid crystal alignments B3 and B4 present a mirror symmetry substantially along the second vertical datum line V2. It should be noted that in other embodiments, the second vertical datum line V2 divides the second pixel electrode area 120 substantial equally, but the liquid crystal alignments B1 and B2 may not present a mirror symmetry substantially along the second vertical datum line V2 and the liquid crystal alignments B3 and B4 may not present a mirror symmetry substantially along the second vertical datum line V2 without departing the scope of the present embodiment. The first vertical datum line V1 is substantially parallel to the second vertical datum line V2. Additionally, in order to achieve the asymmetric viewing angle characteristic, the second horizontal datum line H2 divides the second pixel electrode area 120 into a third alignment area 122 and a fourth alignment area 124 having different sizes.

The third alignment area 122 has a quantity K3 of a third alignment substantially along the second vertical datum line V2. The quantity K3 of the third alignment may be a sum quantity of the liquid crystal alignments B1 and B2 substantially along the second vertical datum line V2. The fourth alignment area 124 has a quantity K4 of a fourth alignment substantially along the second vertical datum line V2. The quantity K4 of the fourth alignment may be a sum quantity of the liquid crystal alignments B3 and B4 substantially along the second vertical datum line V2. In the present embodiment, the quantity K3 of the third alignment is reverse to the quantity K4 of the fourth alignment, and the quantity K3 of the third alignment is substantially smaller than the quantity K4 of the fourth alignment.

In the disclosure, the liquid crystal alignments at different angles can be achieved through different techniques. Taking the pixel structure illustrated in FIG. 2B as an example, in the present embodiment, alignment slits 202 in different directions are formed on the pixel electrode 200 of the sub-pixel 100*a* so that the running direction of liquid crystal molecules is determined by the directions of the alignment slits 202. To be specific, referring to both FIG. 2A and FIG. 2B, the first pixel electrode area 110 and the second pixel electrode area 120 of each sub-pixel 100*a* respectively have a first pixel electrode 210 and a second pixel electrode 220 independent to each other, and each sub-pixel 100*a* may be driven by two scan lines G1 and G2 and a data line D1, wherein the scan line G1 and the data line D1 control the first pixel electrode 210, and the scan line G2 and the data line D1 control the second pixel electrode 220. With such a layout, in the present embodiment, the same or different driving voltages may be supplied to the first pixel electrode 210 and the second pixel electrode 220 so as to allow the first pixel electrode area 110 and the second pixel electrode area 120 to present substantially the same or different display grayscales. Actually, the first pixel electrode 210 and the second pixel electrode 220 need to be driven independently. Even though two scan lines G1 and G2 and a data line D1 are disposed for driving the two pixel electrodes in the present embodiment, in other embodiments of the disclosure, the two pixel electrodes may also be driven by using one scan line and two data lines or any other possible scan line/data line combinations.

In the present embodiment, the first pixel electrode 210 includes a first horizontal backbone 212 (or namely horizontal main-truck, horizontal main-body), a first vertical backbone 214 (or namely vertical main-truck, vertical main-body), and a plurality of first branches 216. The first horizontal backbone 212 is substantially disposed along the first horizontal datum line H1, and the first vertical backbone 214 is substantially disposed along the first vertical datum line V1, so that the first horizontal backbone 212 and the first vertical backbone 214 divide the first pixel electrode area 110 into four quadrants E1-E4 corresponding to aforementioned four first alignment sub-areas 110*a*. The first horizontal backbone 212 and the first vertical backbone 214 substantially interlace each other. Preferably, the first horizontal backbone 212 and the first vertical backbone 214 are substantially perpendicular to each other. However, the disclosure is not limited thereto, and the first horizontal backbone 212 and the first vertical backbone 214 may also interlace each other in any other suitable angle, such as about 45°, about 60°, about 80°, about 110°, or about 130°. The quadrants E1, E2, E3, and E4 respectively have a plurality of first branches 216 substantially disposed in parallel. An alignment slit 202 is formed between adjacent two first branches 216. The first branches 216 and the alignment slits 202 of the quadrant E1, E2, E3, or E4 run substantially parallel to the liquid crystal alignments A1-A4 of the corresponding first alignment sub-area 110*a*. In other words, in the present embodiment, the liquid crystal alignments A1-A4 of the corresponding first alignment sub-area 110*a* are determined according to the directions of the first branches 216 and the alignment slits 202.

Similarly, in the present embodiment, the second pixel electrode 220 includes a second horizontal backbone 222 (or namely horizontal main-truck, horizontal main-body), a second vertical backbone 224 (or namely vertical main-truck, vertical main-body), and a plurality of second branches 226. The second horizontal backbone 222 is substantially disposed along the second horizontal datum line H2, and the second vertical backbone 224 is substantially disposed along the second vertical datum line V2, so that the second horizontal backbone 222 and the second vertical backbone 224 divide the second pixel electrode area 120 into four quadrants F1-F4 corresponding to aforementioned four second alignment sub-areas 120*a*. The second horizontal backbone 222 and the second vertical backbone 224 interlace each other. Preferably, the second horizontal backbone 222 and the second vertical backbone 224 are substantially perpendicular to each other. However, the disclosure is not limited thereto, and the second horizontal backbone 222 and the second vertical backbone 224 may also interlace each other in any other suitable angle, such as about 45°, about 60°, about 80°, about 110°, or about 130°. The quadrants F1, F2, F3, and F4 respectively have a plurality of second branches 226 substantially disposed in parallel. An alignment slit 202 is formed between adjacent two second branches 226. The second branches 226 and the alignment slits 202 of the quadrant F1, F2, F3, or F4 run substantially parallel to the liquid crystal alignments B1-B4 of the corresponding second alignment sub-area 120*a*. In other words, in the present embodiment, the liquid crystal alignments B1-B4 of the corresponding second alignment sub-area 120*a* are determined by the directions of the second branches 226 and the alignment slits 202.

In the present embodiment, the first horizontal datum line H1 and the first vertical datum line V1 are defined by using the horizontal direction and the vertical direction when a user looks at the LCD panel 100. Viewed from another point of view, the first horizontal datum line H1 may be parallel to the scan line G1 or G2 of the LCD panel 100, and the first vertical datum line V1 may be parallel to the data line D1 of the LCD panel 100. However, defining the first horizontal datum line H1 and the first vertical datum line V1 by using the scan line G1 or G2 or the data line D1 is only an example. Actually, in other embodiments of the disclosure, the scan lines of the LCD panel 100 may also be vertical, while the data lines of the LCD panel 100 may also be horizontal. The directions of the scan lines and data lines of the LCD panel 100 are not limited in the disclosure and can be determined according to the actual pixel design of the LCD panel 100.

In the disclosure, preferably, asymmetric alignment sub-areas are formed in each sub-pixel so as to achieve an asymmetric viewing angle effect. In the embodiment described above, preferably, the first horizontal backbone 212 of the first pixel electrode 210 and the second horizontal backbone 222 of the second pixel electrode 220 are shifted in the vertical direction so that the first alignment area 112 in the first pixel electrode area 110 is substantially greater than the second alignment area 114 in the first pixel electrode area 110, and the third alignment area 122 in the second pixel electrode area 120 is substantially smaller than the fourth alignment area 124 in the second pixel electrode area 120. It should be noted that in other embodiments, the asymmetric viewing angle effect can still be achieved by not shifting the first horizontal backbone 212 of the first pixel electrode 210 in the vertical direction but shifting the second horizontal backbone 222 of the second pixel electrode 220 in the vertical direction. Accordingly, in each sub-pixel 100a, the proportion taken by the liquid crystal alignments A1 and A2 of the first pixel electrode area 110 is substantially greater than that taken by the liquid crystal alignments A3 and A4. Additionally, in each sub-pixel 100a, the proportion taken by the liquid crystal alignments B1 and B2 of the second pixel electrode area 120 is substantially smaller than that taken by the liquid crystal alignments B3 and B4.

Figure 3:
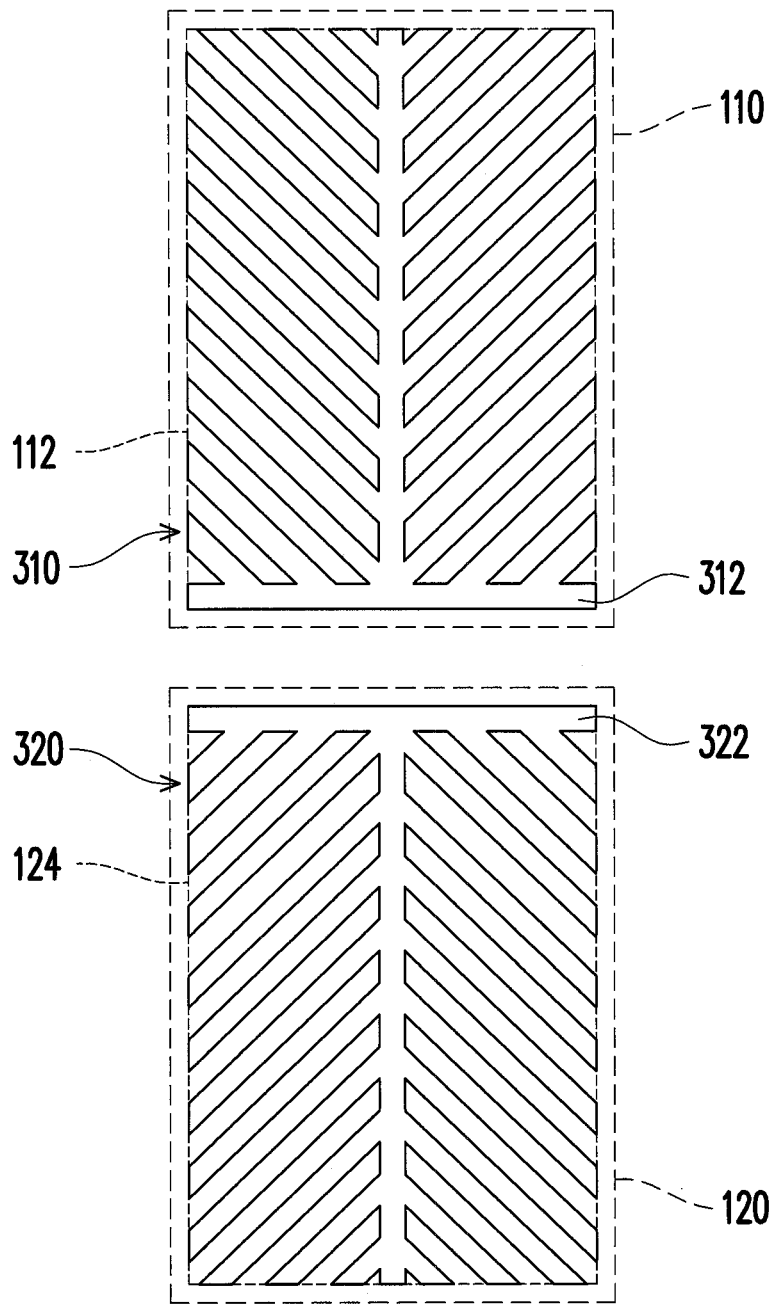
FIG. 3 illustrates another pixel structure applicable to the LCD panel in FIG. 1.
Figure 4:
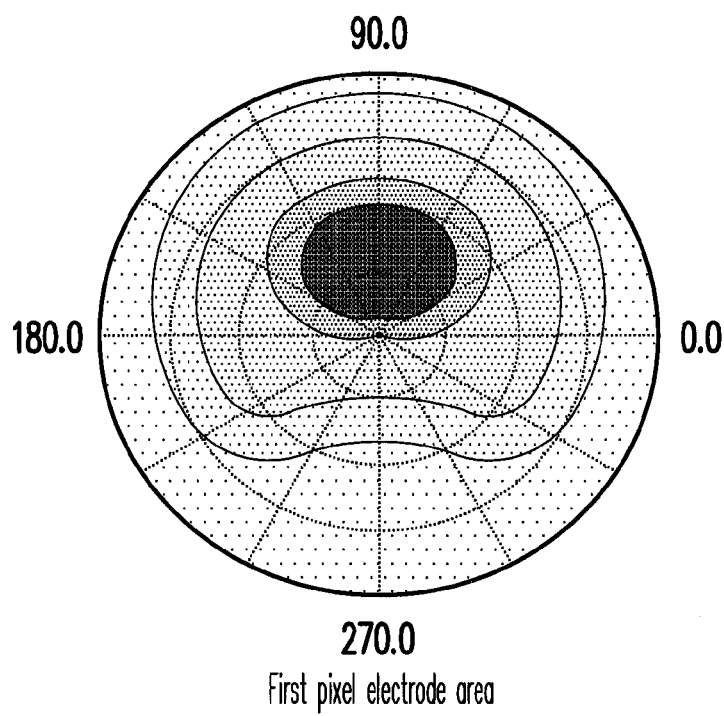
FIG. 4 illustrates the iso-luminance contours or iso-luminance curves of a first pixel electrode area and a second pixel electrode area of a sub-pixel at different viewing angles.
Figure 4:
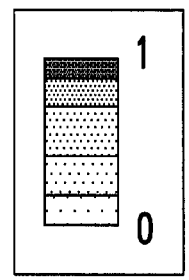
Figure 4:
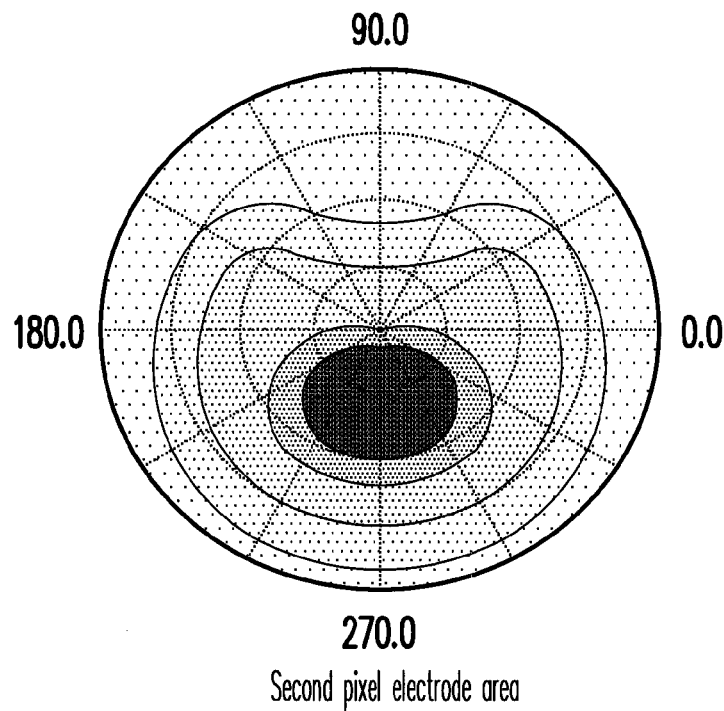
Figure 4:
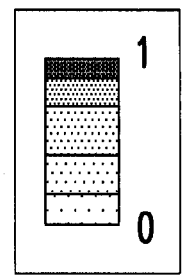
Figure 5:
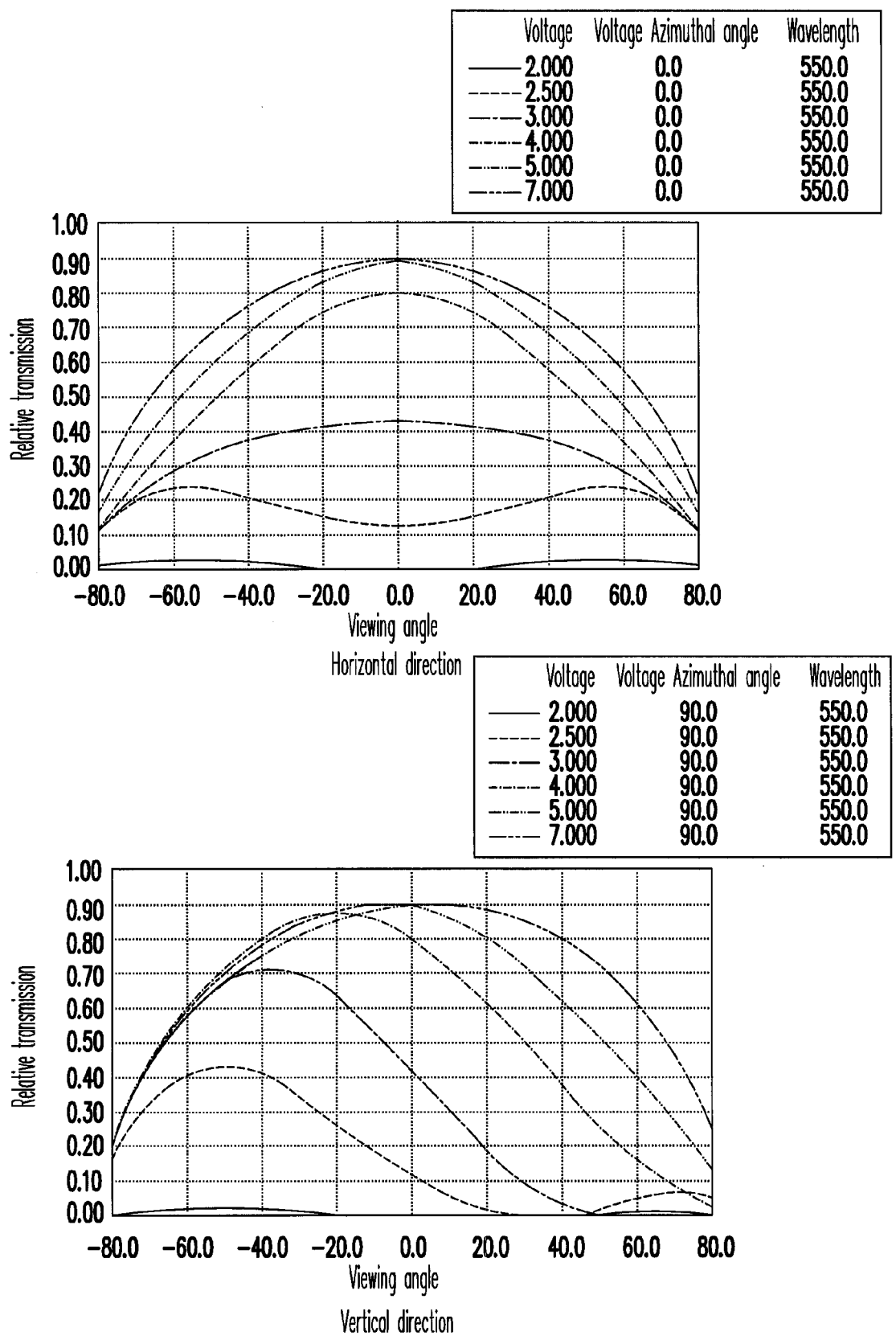
FIG. 5 illustrates the relationship between viewing angle and transmission respectively in a horizontal direction and a vertical direction within a second pixel electrode area when different driving voltages are supplied.

However, in the disclosure, as shown in FIG. 3, the first horizontal backbone 312 of the first pixel electrode 310 may also be shifted downwards to the edge of the first pixel electrode area 110 along the vertical direction, so as to maximize the first alignment area 112. Meanwhile, the second horizontal backbone 322 of the second pixel electrode 320 is shifted upwards to the edge of the second pixel electrode area 120 along the vertical direction to maximize the fourth alignment area 124. In other words, in the disclosure, the first horizontal backbone 312 and the second horizontal backbone 322 can be shifted differently to adjust the liquid crystal alignment proportions of the first pixel electrode area 110 and the second pixel electrode area 120 according to the actual design requirement Based on the asymmetric alignment sub-area design described above, the optical characteristics of the sub-pixels 100a at different viewing angles can be explained with reference to FIG. 4 and FIG. 5. FIG. 4 and FIG. 5 illustrate results observed by looking at the sub-pixels 100a perpendicularly. Herein it is assumed that the liquid crystal alignments A1, A2, A3, and A4 are respectively about 225°, about 315°, about 45°, and about 135° and the liquid crystal alignments B1, B2, B3, and B4 are respectively about 225°, about 315°, about 45°, and about 135°. FIG. 4 illustrates iso-luminance contours or iso-luminance curves of a first pixel electrode area and a second pixel electrode area of a sub-pixel at different viewing angles, and FIG. 5 illustrates the relationship between viewing angle and transmission respectively in the horizontal direction and the vertical direction within the second pixel electrode area 120 when different driving voltages are supplied. Herein the angles of the liquid crystal alignments A1-A4 and B1-B4 are defined as the angles formed by the datum line of about 0° in FIG. 4 and the directions of the liquid crystal alignments A1-A4 and B1-B4 in FIG. 2A indicated with the arrows.

As shown in FIG. 4, the liquid crystal alignments A1 (about +45°) and A2 (about +135°) of the first pixel electrode area 110 take up a greater proportion, and the transmission luminous thereof contributes mostly to the upper side and the central front. The liquid crystal alignments B3 (about −135°) and B4 (about −45°) of the second pixel electrode area 120 take up a greater proportion, and the transmission luminous thereof contributes mostly to the lower side and the central front. Herein the front view means the viewing angle extended from the eyes of a viewer (i.e., the viewing angle direction) to a display surface perpendicular to the LCD panel 100 (i.e., the exterior surface of the display panel.

In addition, as shown in FIG. 5, besides the high grayscale under a high driving voltage, all other grayscales have different luminosities in substantially vertical directions. Thus, in the disclosure, a LCD panel with side-view interference can be design based on this characteristic. Moreover, as shown in FIG. 5, under different driving voltages, the grayscale luminosities at a viewing angle of about 5° in the horizontal direction are actually the same. Namely, a symmetric viewing angle distribution is achieved in the horizontal direction, so that dizziness caused by parallax to the viewer can be avoided.

Figure 6A:
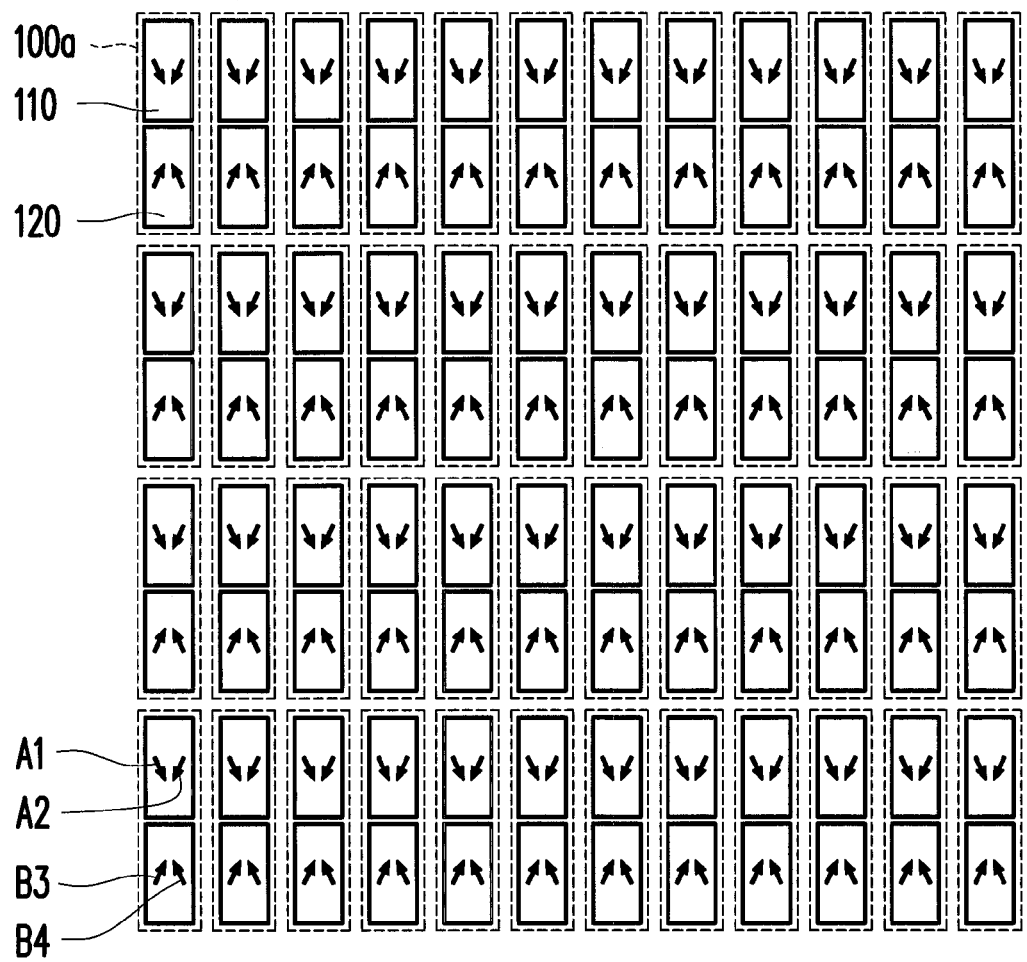
FIG. 6A and FIG. 6B illustrate display state of the LCD panel in FIG. 1 respectively in a wide viewing angle display mode and a narrow viewing angle display mode.
Figure 6B:
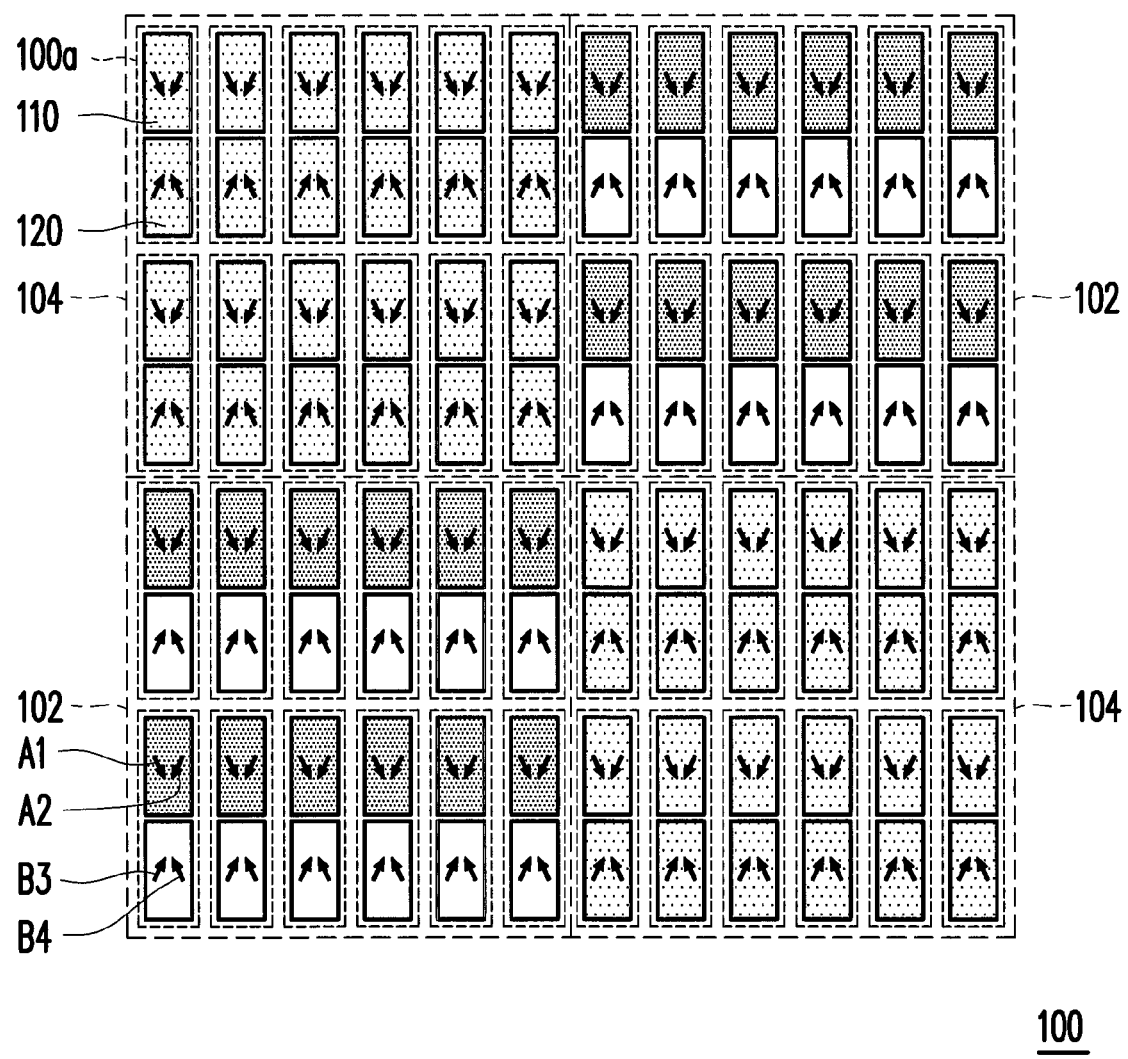

The operation of the LCD panel in the disclosure can be described as a wide viewing angle display mode and a narrow viewing angle display mode. FIG. 6A and FIG. 6B illustrate display state of the LCD panel 100 in FIG. 1 respectively in a wide viewing angle display mode and a narrow viewing angle display mode. Herein the wide viewing angle range is about between 10° and 170°, while the narrow viewing angle range is about between 45° and 135°.

Figure 16A:
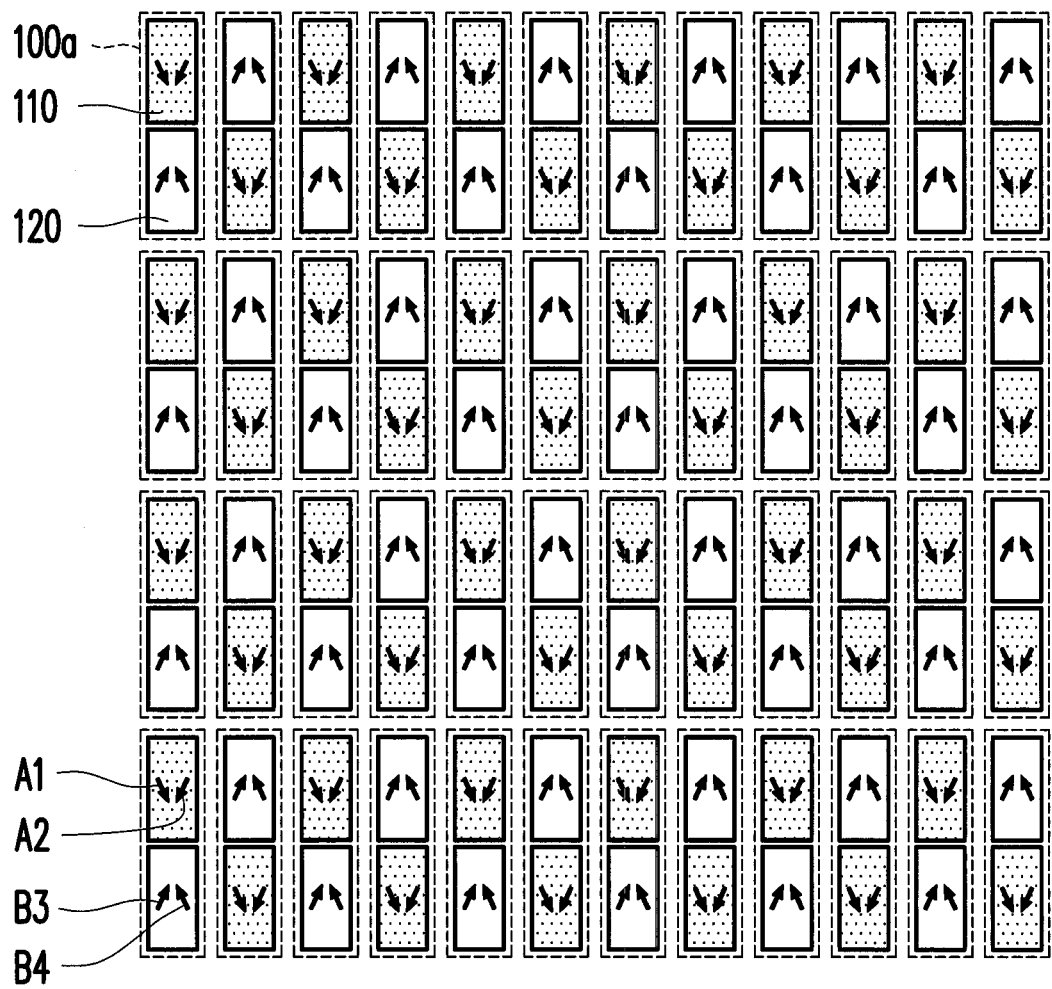
FIG. 16A and FIG. 16B respectively illustrate two designs of adjusting the driving voltages of the first pixel electrode areas and the second pixel electrode areas to reduce color washout at an upper half plane viewing angle and a lower half plane viewing angle in a wide viewing angle display mode.
Figure 16B:
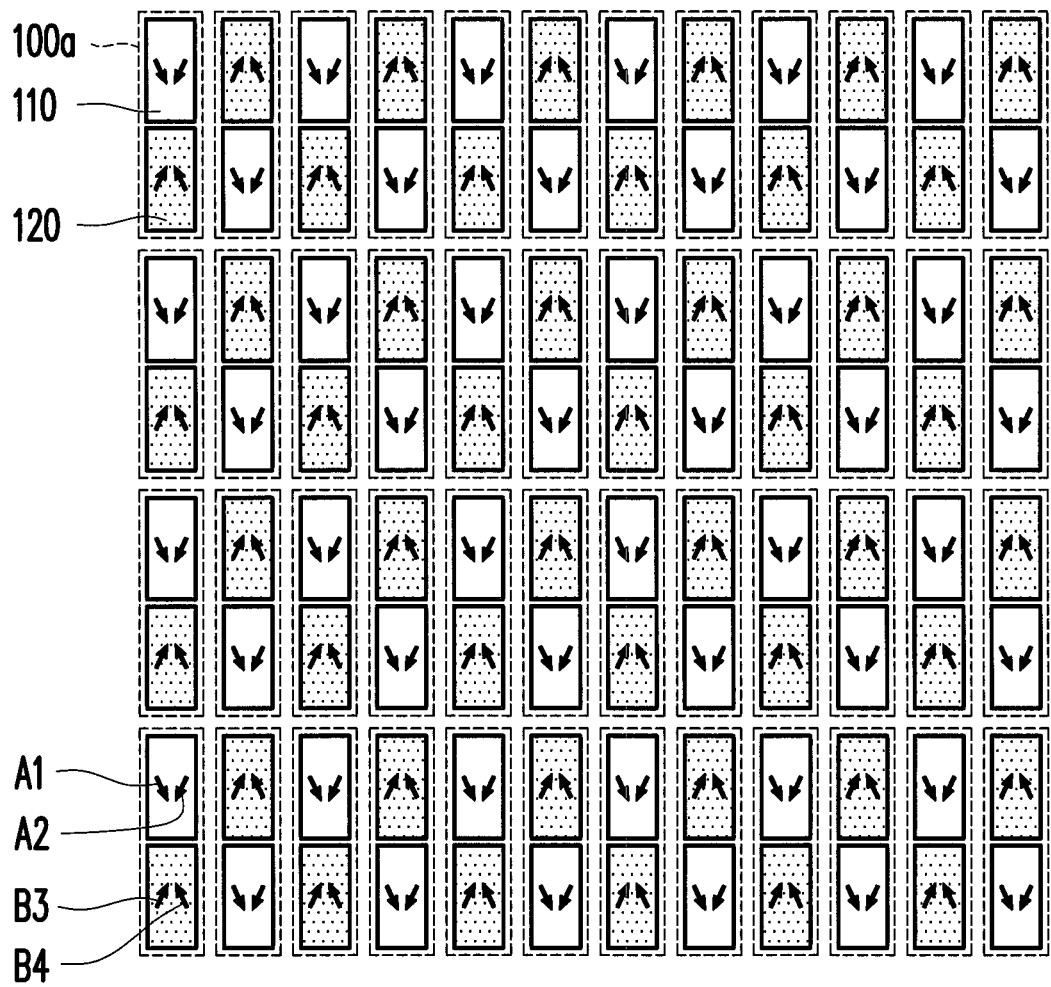

First, as shown in FIG. 6A, in the wide viewing angle display mode, ach sub-pixel 100a of the LCD panel 100 includes a first pixel electrode area 110 and a second pixel electrode area 120, wherein the first pixel electrode area 110 and the second pixel electrode area 120 may be driven by using substantially the same or different voltages, such as the three designs illustrated in FIG. 6A, FIG. 16A, and FIG. 16B. Regarding the design illustrated in FIG. 6A, based on the optical characteristics illustrated in FIG. 4 and FIG. 5, the same luminosity is observed while looking at the first region 102 and the second region 104 from the front or the side. Accordingly, no interference is produced. Herein the first pixel electrode areas 110 and the second pixel electrode areas 120 within the first region 102 and the second region 104 are substantially driven with the same voltage.

Moreover, as shown in FIG. 6B, when the LCD panel 100 is switched to the narrow viewing angle display mode, the first pixel electrode areas 110 and the second pixel electrode areas 120 within the first region 102 and the second region 104 are driven with different voltages.

Figure 7:
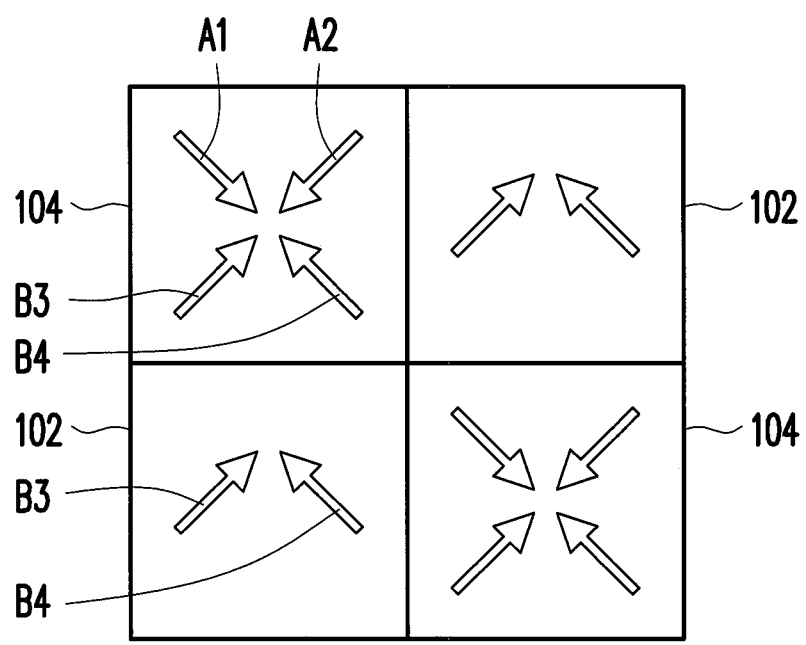
FIG. 7 illustrates the liquid crystal alignment tendencies in different regions of the LCD panel in FIG. 1 in a narrow viewing angle display mode.

To be specific, the first pixel electrode area 110 of each sub-pixel 100a in the first region 102 is disabled (or namely turned off) or supplied with a driving voltage substantially lower than that of other pixel electrode areas, while the second pixel electrode area 120 thereof is enabled (or namely turned on). Because the liquid crystal alignments B3 (about 45°) and B4 (about 135°) of the second pixel electrode area 120 substantially a greater proportion, the overall optical characteristic of the first region 102 is inclined to the liquid crystal alignments B3 (about 45°) and B4 (about 135°). Besides, both the first pixel electrode area 110 and the second pixel electrode area 120 of each sub-pixel 100*a* within the second region 104 are enabled. In this case, in the narrow viewing angle display mode, the liquid crystal alignment of each region on the LCD panel 100 has a tendency as shown in FIG. 7.

In addition, in order to maintain the front view luminosities of the first region 102 and the second region 104 to be approximately the same, the driving voltage of each sub-pixel 100*a* within the second region 104 can be adjusted according to the front view luminosity of the first region 102. To be specific, in the present embodiment, only the second pixel electrode area 120 of each sub-pixel 100*a* within the first region 102 is enabled, and the area thereof is about the half of the entire sub-pixel 100*a*. Accordingly, the front view luminosity contributed by the second pixel electrode area 120 is half of the front view luminosity of the entire sub-pixel 100*a* under the same driving voltage. Thus, in order to maintain the front view luminosities of the first region 102 and the second region 104 to be approximately the same, when substantially the same front view luminosity is displayed, the driving voltages of the first pixel electrode areas 110 and the second pixel electrode areas 120 of the sub-pixels 100*a* within the second region 104 are substantially lower than the driving voltage of the second pixel electrode areas 120 within the first region 102. Herein front view luminosity refers to display luminosity in the normal direction of the display surface of the LCD panel 100.

Figure 8A:
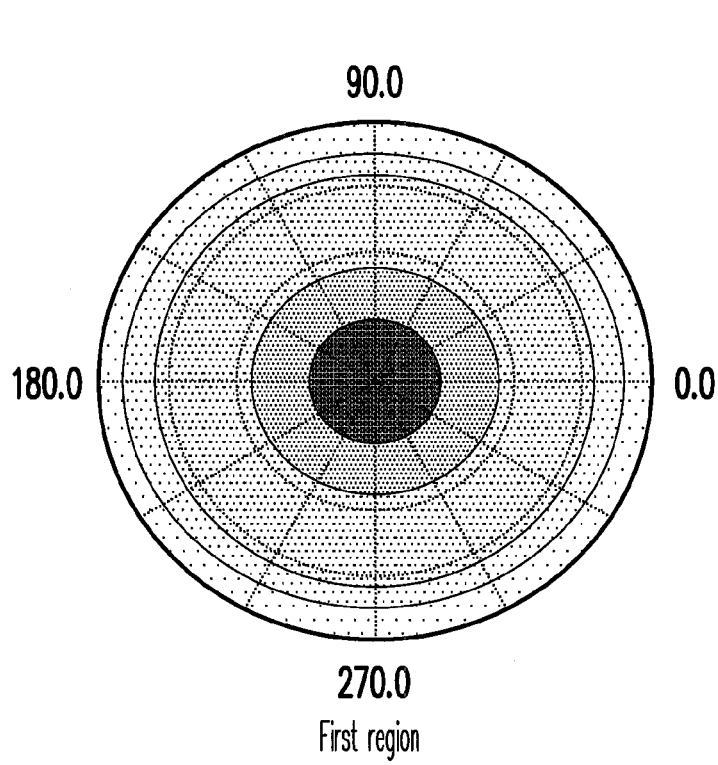
FIG. 8A and FIG. 8B respectively illustrate the iso-luminance contours or iso-luminance curves of a second region and a first region in a narrow viewing angle display mode at different viewing angles.
Figure 8B:
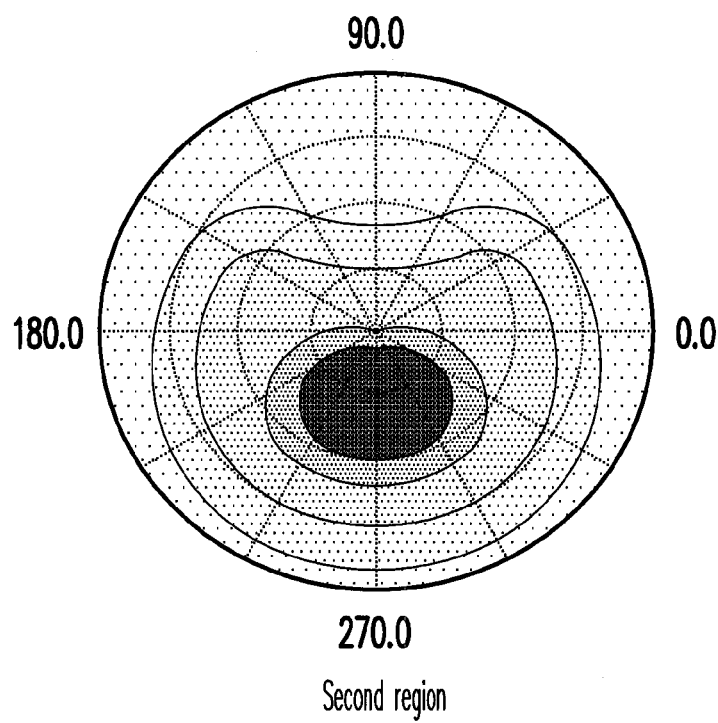
Figure 9:
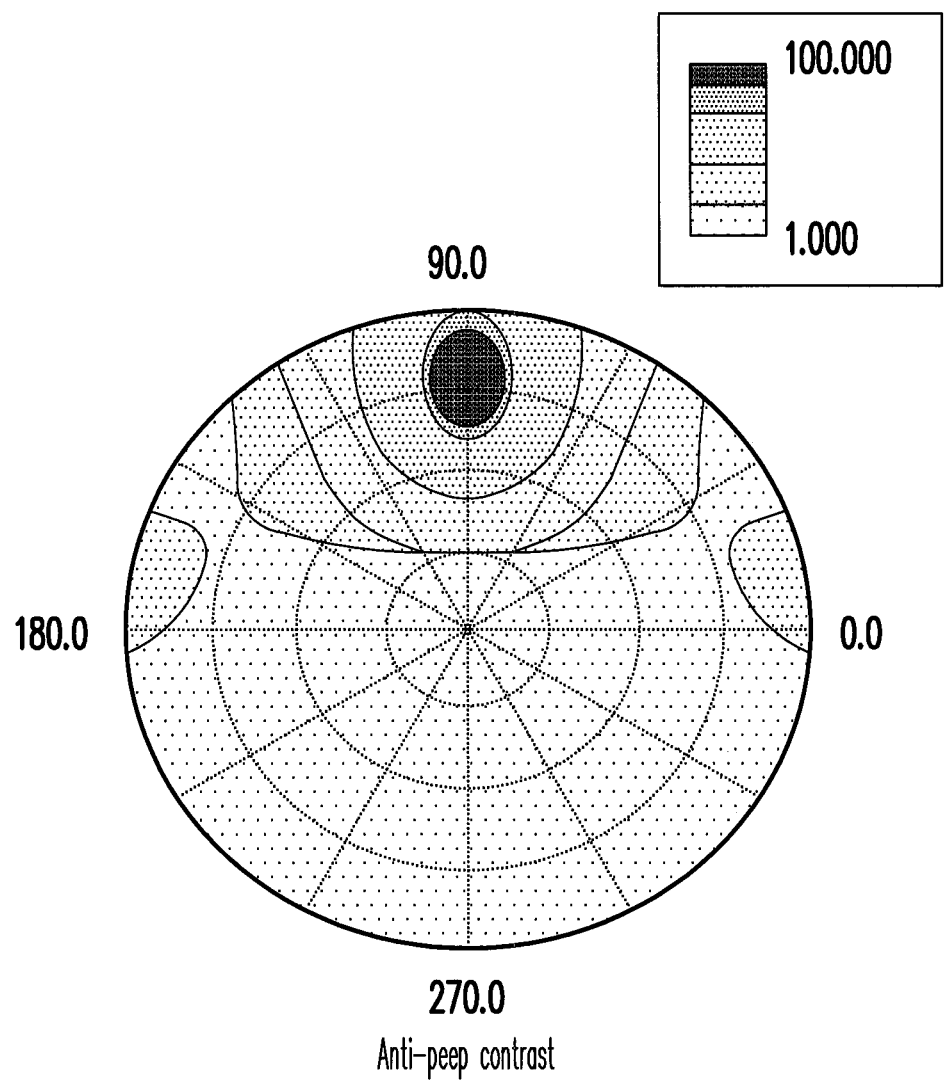
FIG. 9 illustrates the anti-peep contrast distribution on the LCD panel in FIG. 1.

FIG. 8A and FIG. 8B respectively illustrate the iso-luminance contours or iso-luminance curves of the second region 104 and the first region 102 in a narrow viewing angle display mode at different viewing angles. In addition, the anti-peep contrast distribution (i.e., interference of brightness contrast) illustrated in FIG. 9 can be obtained based on the iso-luminance contours or iso-luminance curves illustrated in FIG. 8A and FIG. 8B. Generally speaking, certain anti-peep effect can be achieved when the anti-peep contrast is greater than 2, and an optimal anti-peep effect can be achieved when the anti-peep contrast is greater than 5. As shown in FIG. 9, the design described above offers an especially good anti-peep effect at upper half plane viewing angles.

Similarly, when the second pixel electrode area 120 of each sub-pixel 100*a* within the first region 102 is disabled or a driving voltage substantially lower than those of other pixel electrode areas is supplied thereto in the narrow viewing angle display mode, an optimal anti-peep effect is achieved at the lower half plane viewing angels.

Figure 10A:
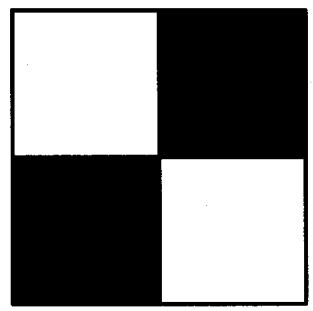
FIG. 10A illustrates display states of different blocks in FIG. 6B observed by a user when the user looks at a display surface of the LCD panel from the front.
Figure 10B:
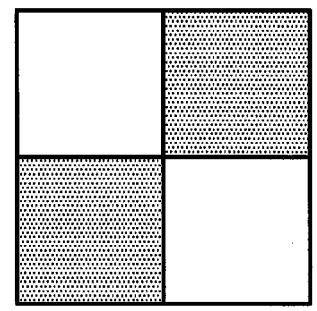
FIGS. 10B-10F respectively illustrate display states of different blocks actually observed by a user at the same viewing angle when the user looks at a display surface of the LCD panel from different azimuthal angles.
Figure 10C:
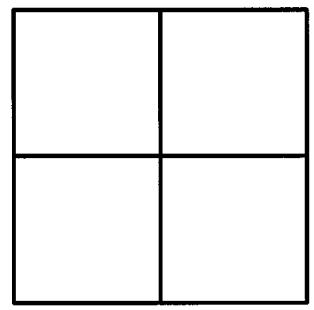
Figure 10D:
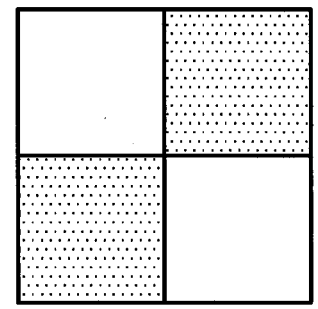
Figure 10E:
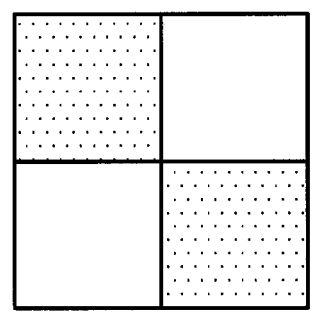
Figure 10F:
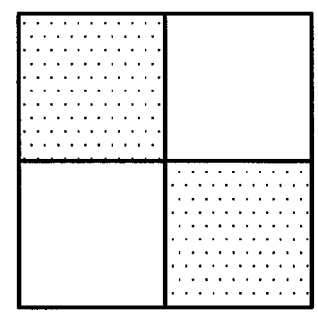

FIG. 10C illustrates display states of different blocks in FIG. 6B actually observed by a user when the user looks straight at a display surface of the LCD panel. As shown in FIG. 10C, different blocks on the LCD panel 100 have substantially the same display luminosity in the front-view direction, FIGS. 10A-10B and 10D-10F respectively illustrate display states of different blocks actually observed by a user at the same side viewing angle when the user looks at a display surface of the LCD panel 100 from different azimuthal angles. Herein azimuthal angle refers to the angle formed by the projection of the viewing direction on the display surface and the horizontal direction. For example, the azimuthal angle in the horizontal direction is about 0° or about 180°, and the azimuthal angle in the vertical direction is about 90° or about 270°. As shown in FIGS. 10B-10F, the entire display surface of the LCD panel 100 presents image blocks having brightness contrast in the side-view direction, so that an anti-peep effect is achieved. Herein the extent of the brightness contrast gradually increases from the bottom of the display surface (azimuthal angle is about 270°) upwards (azimuthal angle is about 90°), and the upper half of the display surface produces certain brightness contrast in the displayed image, so that an anti-peep effect is achieved.

In summary, in the present embodiment, an anti-peep effect is achieved by controlling the sum quantity in the liquid crystal alignment direction within the second pixel electrode area 120, so as to make the luminous flux in the upper half viewing angle direction to be different from that in the lower half viewing angle direction, and by controlling the driving voltage of the first pixel electrode areas 110 to be substantially lower than that of the second pixel electrode areas 120.

The Improvement of Front-View Display Quality in the Narrow Viewing Angle Display Mode As described in foregoing embodiment, based on the arrangement of the first pixel electrode areas 110 and the second pixel electrode areas 120 illustrated in FIG. 6A and FIG. 6B, the sub-pixels 100*a* in the same row have substantially the same liquid crystal alignment. Thus, obvious bright or dark lines may be produced on the adjacent boundary of the first region 102 and the second region 104 in the front-view direction.

Figure 11A:
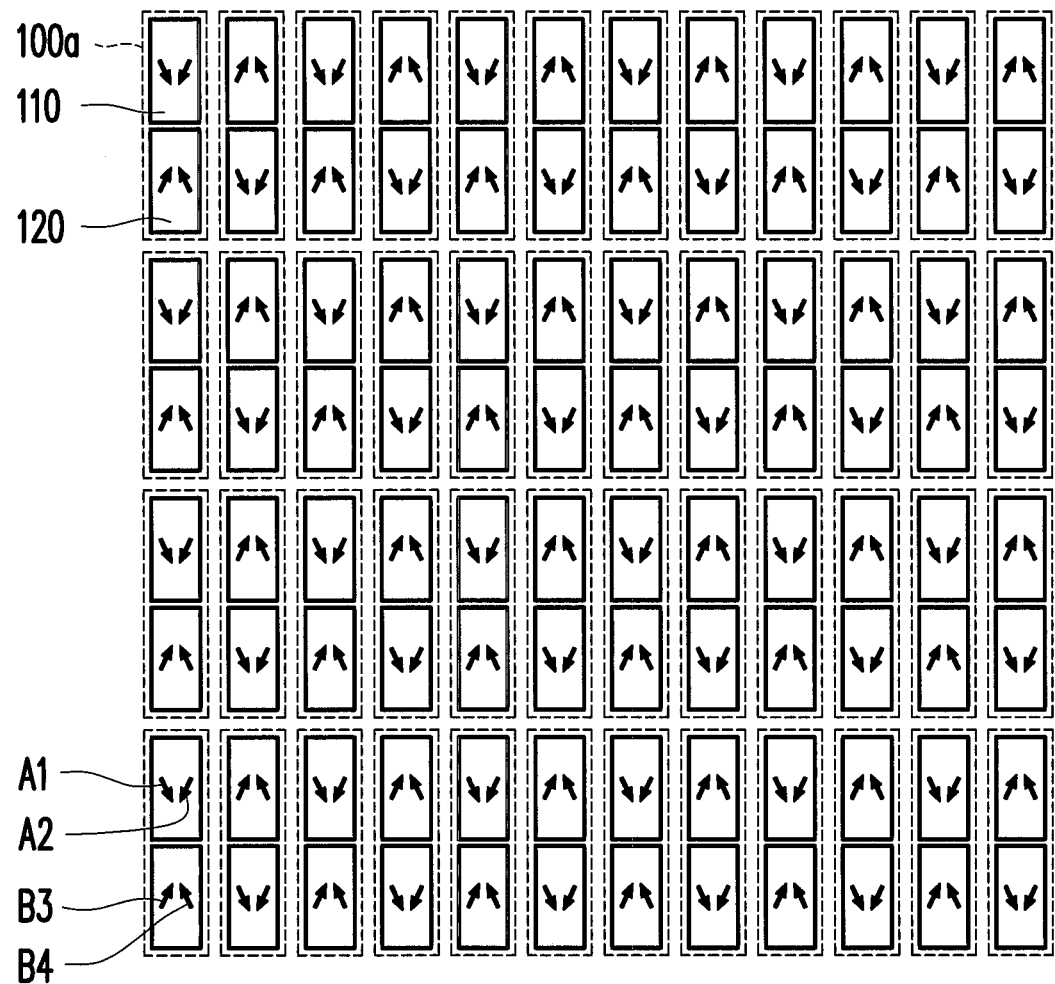
FIG. 11A and FIG. 11B respectively illustrate display states of a LCD panel in a wide viewing angle display mode and a narrow viewing angle display mode after the first pixel electrode areas and the second pixel electrode areas of the sub-pixels are re-arranged.
Figure 11B:
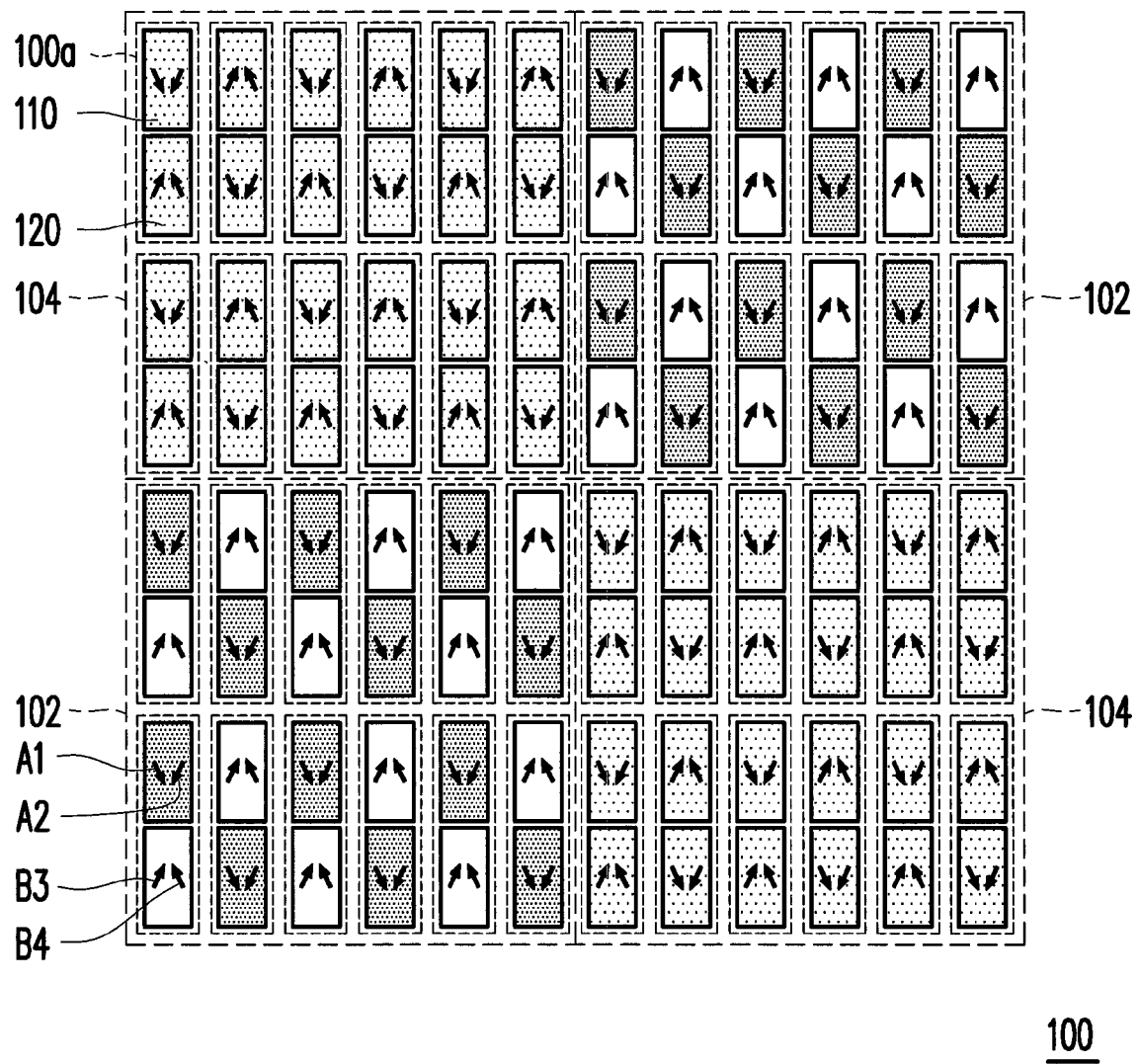

In the disclosure, the arrangement of the first pixel electrode areas 110 and the second pixel electrode areas 120 of the sub-pixels 100*a* is re-designed in order to eliminate aforementioned obvious bright or dark lines. To be specific, as shown in FIG. 11A and FIG. 11B, the first pixel electrode area 110 and the second pixel electrode area 120 of each sub-pixel 100*a* are substantially arranged along the vertical direction, and the first pixel electrode areas 110 and the second pixel electrode areas 120 of any adjacent two sub-pixels 100*a* in the substantially horizontal direction are reversely arranged. Thus, when the LCD panel 100 is in the narrow viewing angle display mode as shown in FIG. 11B, the disabled (or namely turned off) first pixel electrode areas 110 within the first region 102 are alternatively disposed and accordingly no obvious bright or dark line is formed at the boundary.

With aforementioned arrangement, when the LCD panel 100 is switched to the narrow viewing angle display mode, it is assumed that the front view luminosity proportion of the first pixel electrode areas 110 and the second pixel electrode areas 120 within the first region 102 is about 0:10 (i.e., the first pixel electrode areas 110 are disabled (or namely turned off) and the second pixel electrode areas 120 are enabled (or namely turned on)). In this case, the front view luminosity proportion of the first pixel electrode areas 110 and the second pixel electrode areas 120 within the second region 104 can be further adjusted.

Figure 12A:
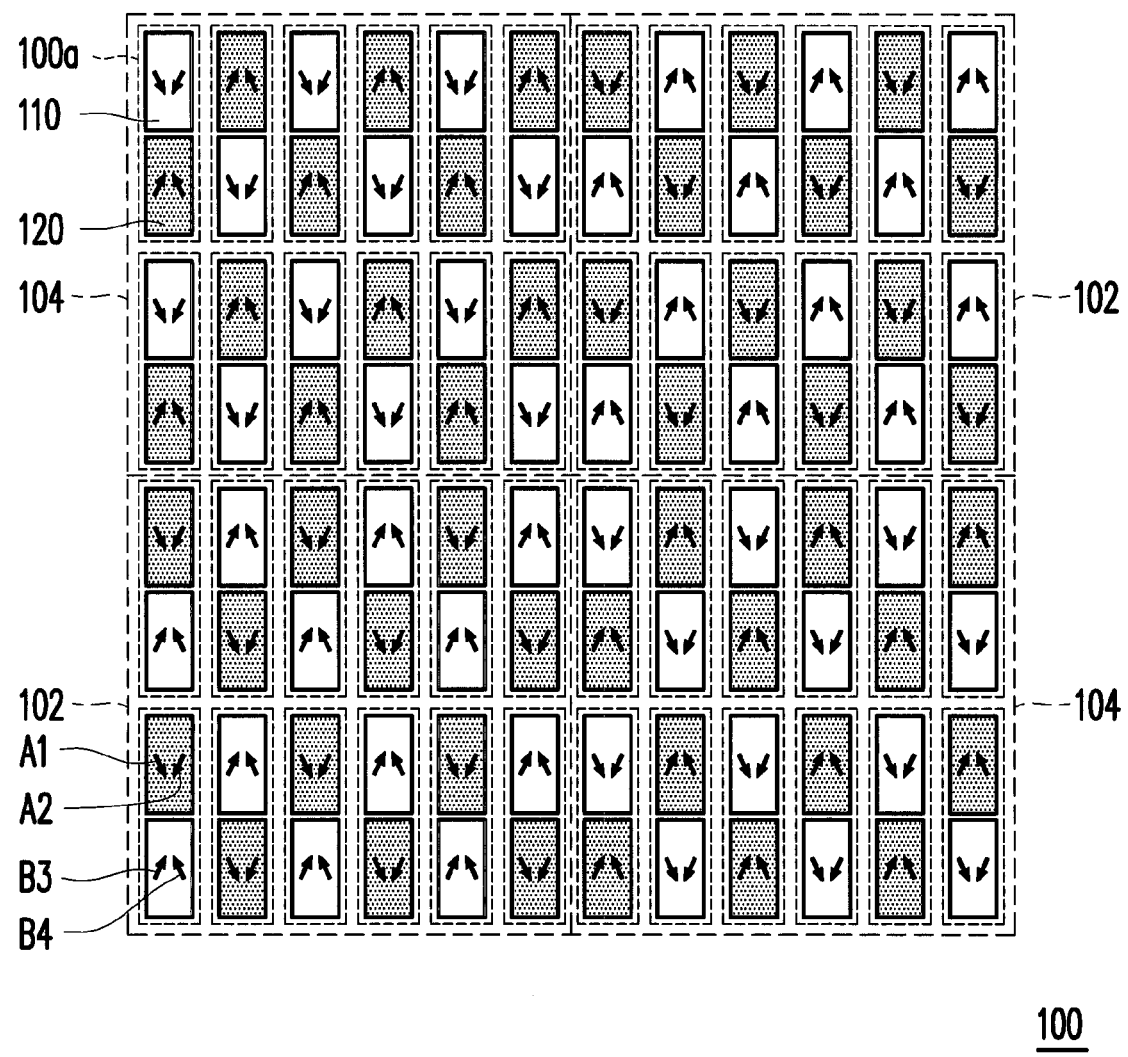
FIGS. 12A-12C respectively illustrate display states of a LCD panel in a narrow viewing angle display mode when the first pixel electrode areas and the second pixel electrode areas in the second region have different front view luminosity proportions.
Figure 12B:
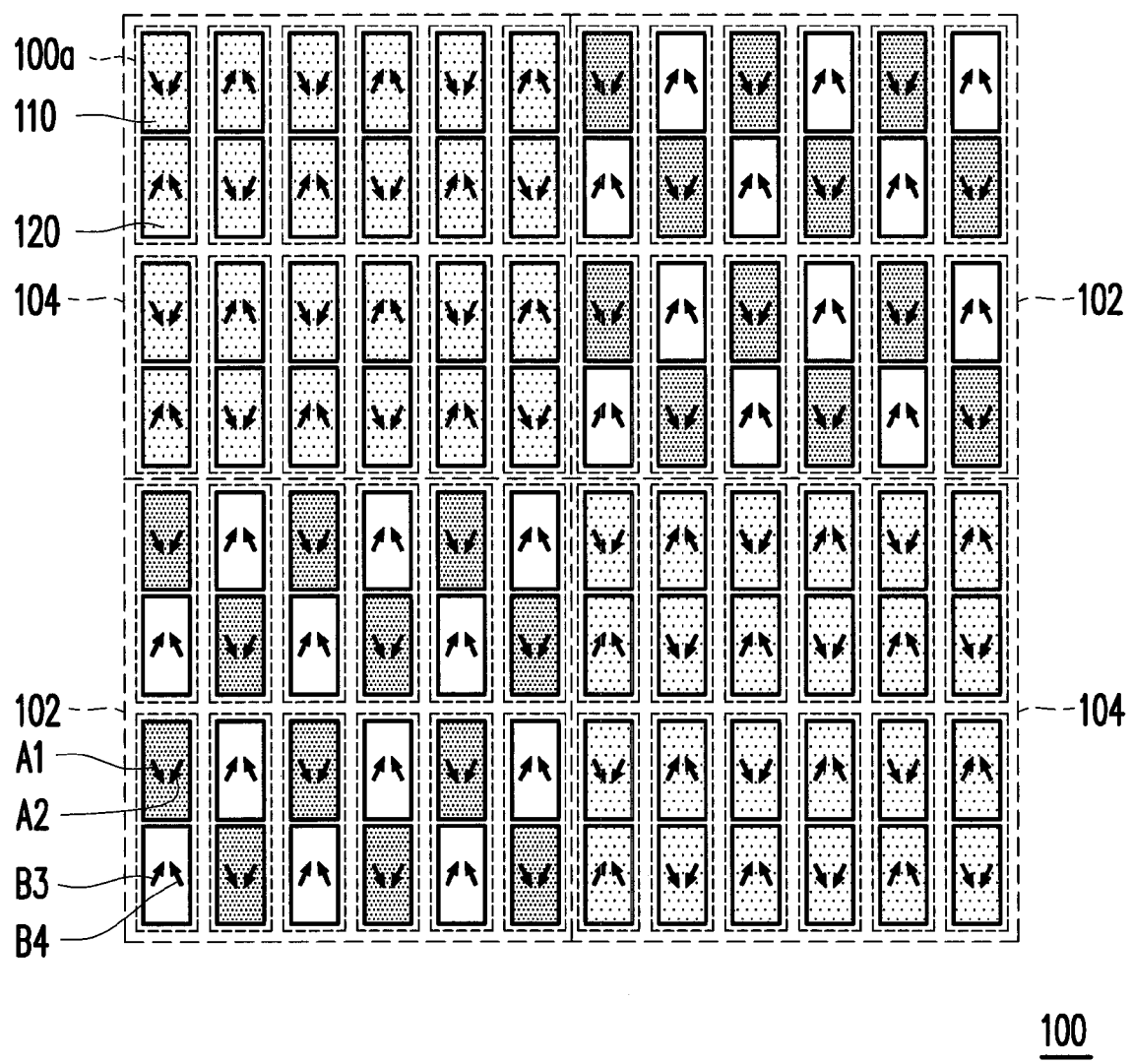
Figure 12C:
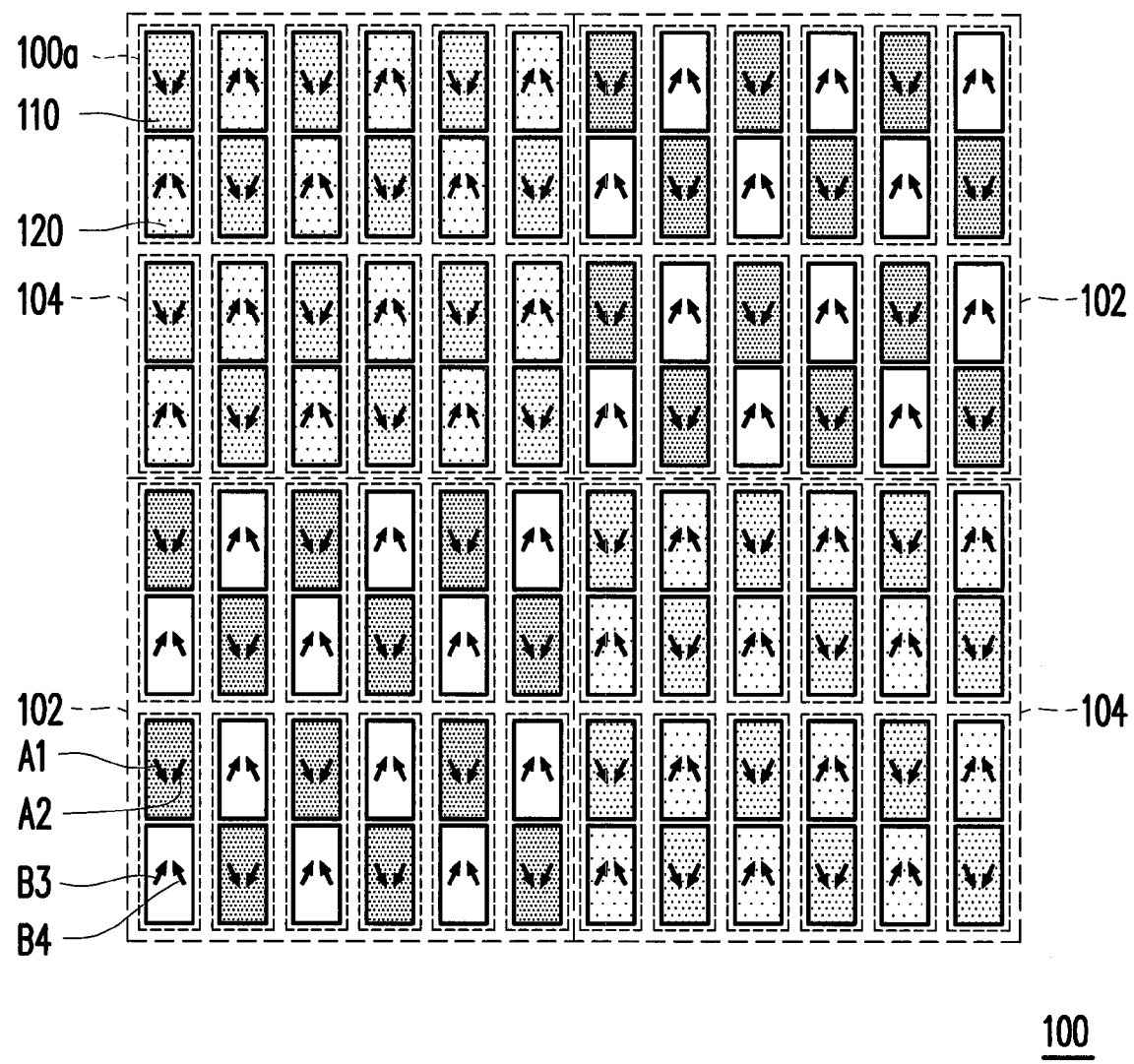

FIGS. 12A-12C respectively illustrate display states of the LCD panel 100 in a narrow viewing angle display mode when the first pixel electrode areas 110 and the second pixel electrode areas 120 within the second region 104 have different front view luminosity proportions, wherein FIG. 12A illustrates the display states when the front view luminosity proportion of the first pixel electrode areas 110 and the second pixel electrode areas 120 is about 10:0, and FIG. 12B illustrates the display state when the front view luminosity proportion of the first pixel electrode areas 110 and the second pixel electrode areas 120 is about 5:5, and FIG. 12C illustrates the display state when the front view luminosity proportion of the first pixel electrode areas 110 and the second pixel electrode areas 120 is about 1:9.

The front view luminosity proportion in the present disclosure is a relative value, wherein the value 0 represents the lowest front view luminosity proportion of a grayscale, and the value 10 represents the highest front view luminosity proportion of a grayscale.

As shown in FIGS. 12A-12C, the closer to about 10:0 the front view luminosity proportion of the first pixel electrode areas 110 and the second pixel electrode areas 120 is, the better the anti-peep effect is, but the boundary between the first region 102 and the second region 104 becomes more discontinuous. Contrarily, the closer to about 1:9 the front view luminosity proportion of the first pixel electrode areas 110 and the second pixel electrode areas 120 is, the more unsatisfactory the anti-peep effect is, but a better continuity of the boundary between the first region 102 and the second region 104 can be achieved.

The front view luminosity proportion of the first pixel electrode areas 110 and the second pixel electrode areas 120 may be controlled substantially between 5:5 and 1:9 to achieve both a good anti-peep effect and a good front-view display quality.

In other words, the front view luminosity proportion of the second pixel electrode area 120 of each sub-pixel 100a within the second region 104 is substantially greater than or equal to the front view luminosity proportion of the first pixel electrode area 110 of the same sub-pixel 100a. The ratio of the front view luminosity proportion of the second pixel electrode area 120 to the front view luminosity proportion of the first pixel electrode area 110 is substantially greater than or equal to 1.

Additionally, because when the LCD panel 100 is switched to the narrow viewing angle display mode, some are driven with a lower or disabled driving voltage (for example, the first pixel electrode areas 110 within the first region 102), the total front view luminosity decreases. In this case, the backlight source can be adjusted to be brighter than it is in the wide viewing angle display mode (i.e., the front view luminosities in the wide viewing angle display mode and the narrow viewing angle display mode are controlled to be approximately the same by adjusting the intensity of the backlight source) to maintain a good front view display quality.

Thereby, as described above, the front view display quality of a LCD panel is improved through the pixel arrangement, the adjustment of the front view luminosity proportion of the second pixel electrode areas, and the adjustment of the backlight source.

Figure 13:
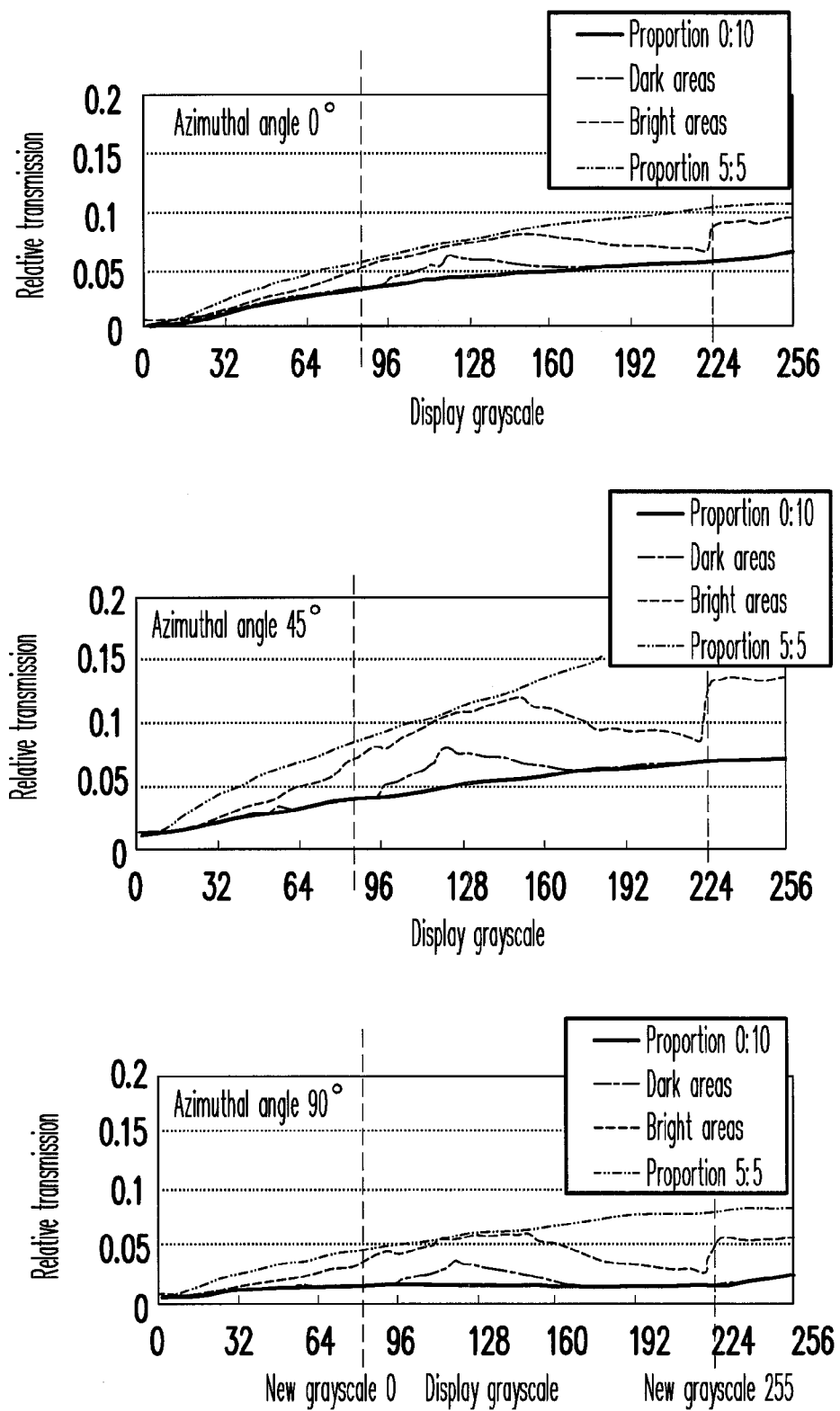
FIG. 13 illustrates the relationship between side-view transmission and display grayscale of a first region or a second region in a horizontal direction (with an azimuthal angle of about 0°), with an azimuthal angle of about 45°, and in a vertical direction (with an azimuthal angle of about 90°).

The Improvement of Side-View Anti-Peep Effect in the Narrow Viewing Angle Display Mode Based on the design illustrated in FIG. 12B and FIG. 12C, in the disclosure, the front view luminosity proportions of the first pixel electrode areas 110 and the second pixel electrode areas 120 within both the first region 102 and the second region 104 may be maintained substantially between 5:5 and 0:10. In this case, if the front view luminosities of the first region 102 and the second region 104 at different display grayscales are all substantially the same, the relation curves between side view luminosity distribution and display grayscale illustrated in FIG. 13 can be obtained. FIG. 13 illustrates the relationship between relative transmission (i.e., the ratio of the side view luminosity to the maximum front view luminosity) and display grayscale of the first region 102 or the second region 104 in a substantially horizontal direction (with an azimuthal angle of about 0°), with an azimuthal angle of about 45°, and in a substantially vertical direction (with an azimuthal angle of about 90°) and the relationship between relative transmission and display grayscale when the front view luminosity proportion is respectively about 0:10 and 5:5. When each display grayscale is set to fixed proportions about 0:10 and 5:5, the maximum side view luminosity and the minimum side view luminosity are as shown in FIG. 13. It can be understood from FIG. 13 that side view grayscale inversion is observed in the first region 102 or the second region 104 in the substantially horizontal direction (azimuthal angle is about 0°), with an azimuthal angle of about 45°, and in the substantially vertical direction (azimuthal angle is about 90°). Namely, when the display grayscale increase, the side view luminosity decreases relatively. Thus, in the disclosure, the anti-peep effect of the LCD panel 100 in the narrow viewing angle display mode can be enhanced through grayscale inversion. In other words, the proportion of each grayscale is individually adjusted to allow the side view luminosity to change between the maximum side view luminosity and the minimum side view luminosity. The anti-peep effect can be enhanced if grayscale inversion is produced (i.e., luminosity decreases along with the increase of grayscale).

To be specific, referring to FIGS. 12A-12C, compared to the design in foregoing embodiment that the ratio of the front view luminosity proportion of the first pixel electrode area 110 of each sub-pixel 100a within the second region 104 to the front view luminosity proportion of the second pixel electrode area 120 of the same sub-pixel 100a is a constant value, in the present embodiment, the front view luminosity proportion of the first pixel electrode area 110 and the second pixel electrode area 120 can be selected according to different display grayscales. On the other hand, the first pixel electrode area 110 and the second pixel electrode area 120 of each sub-pixel 100a within the first region 104 may have a front view luminosity proportion substantially between 5:5 and 0:10, and the first pixel electrode area 110 and the second pixel electrode area 120 of each sub-pixel 100a within the second region may have another front view luminosity proportion substantially between 5:5 and 0:10, wherein the front view luminosity proportion of the first display grayscale is not equal to the front view luminosity proportion of the second display grayscale.

Referring to FIG. 13, the front view luminosity proportion of each grayscale is adjusted. For example, by taking the grayscale 110 as a turning point, the front view luminosity proportion of each grayscale between 0 and 110 in the first region 102 gradually increases from about 0:10 to 5:5. When the grayscale is over 110, the front view luminosity proportion gradually decreases to about 0:10. It is the same in the second region 104, wherein the grayscales 140 and 220 may be taken as turning points. Additionally, while adjusting the proportion of the grayscale inversion, the side view luminosity of the second region should be greater than that of the first region, especially at high grayscale display, in order to achieve an optimal anti-peep effect.

However, foregoing design with grayscale inversion can be applied to the first region 102 or the second region 104 or both the first region 102 and the second region 104. In addition, the range of the front view luminosity proportion can be extended from about 5:5~10:0 (or namely substantially between 5:5 to 10:0) to about 0:10~10:0 (or namely substantially between 0:10 to 10:0) if the front view display quality is not considered.

Moreover, in order to enhance the anti-peep effect in a specific working mode, for example, when a black and white image is displayed, in order to make the black interference block to be as dark as the black characters on a white image, so as to block and interfere the characters effectively, new driving voltages of grayscales 0 and 255 can be defined. Taking the curves in FIG. 13 as an example, the maximum luminosity in the narrow viewing angle display mode can be set to the grayscale 224 in the wide viewing angle display mode, and the minimum luminosity in the narrow viewing angle display mode can be set to the grayscale 85 in the wide viewing angle display mode. Meanwhile, the grayscale 85 of the first region 102 adopts the front view luminosity proportion of the second region 104 so that the black characters can quickly brighten up at side viewing angles. Besides, in the narrow viewing angle display mode, the grayscales around the maximum grayscale 224 in the second region should be close to the luminosity proportion of about 5:5 to increase the side view luminosity of the second region. Meanwhile, the grayscales around the maximum grayscale 224 in the first region should be close to the luminosity proportion of about 0:10 to decrease the side view luminosity of the first region, so that an optimal anti-peep effect can still be achieved through grayscale inversion in a black and white image.

As described above, in the narrow viewing angle display mode, all the luminosity proportions are in unit of pixel, and in the first region and the second region, different front view luminosity proportions are achieved by respectively adjusting the driving voltages of the first sub-areas and the second sub-areas, so that a brightness interfered image is produced at side viewing angles. In the disclosure, a color interfered image may further be produced at side viewing angles in at least the first region and the second region by adjusting different proportions in unit of sub-pixel. For example, in each pixel of the first region, the luminosity proportion of the first pixel electrode area and the second pixel electrode area of a red sub-pixel is about 5:5, the luminosity proportion of the first pixel electrode area and the second pixel electrode area of a green sub-pixel is about 0:10, and the luminosity proportion of the first pixel electrode area and the second pixel electrode area of a blue sub-pixel is also about 0:10. In this case, the colors displayed by each red, green, and blue sub-pixel at the front viewing angle are the same as the colors originally displayed by these sub-pixels. Meanwhile, a higher luminosity is observed from side viewing angles the proportion of about 5:5 than with the proportion of about 0:10. Thus, a viewer observes a reddish color in the first region from the side viewing angles. Similarly, in other regions, the red, green, and blue sub-pixels can be distributed in another proportion to obtain other interference colors.

The Improvement of Anti-Peep Contrast by Adjusting Alignment Directions

Figure 14:
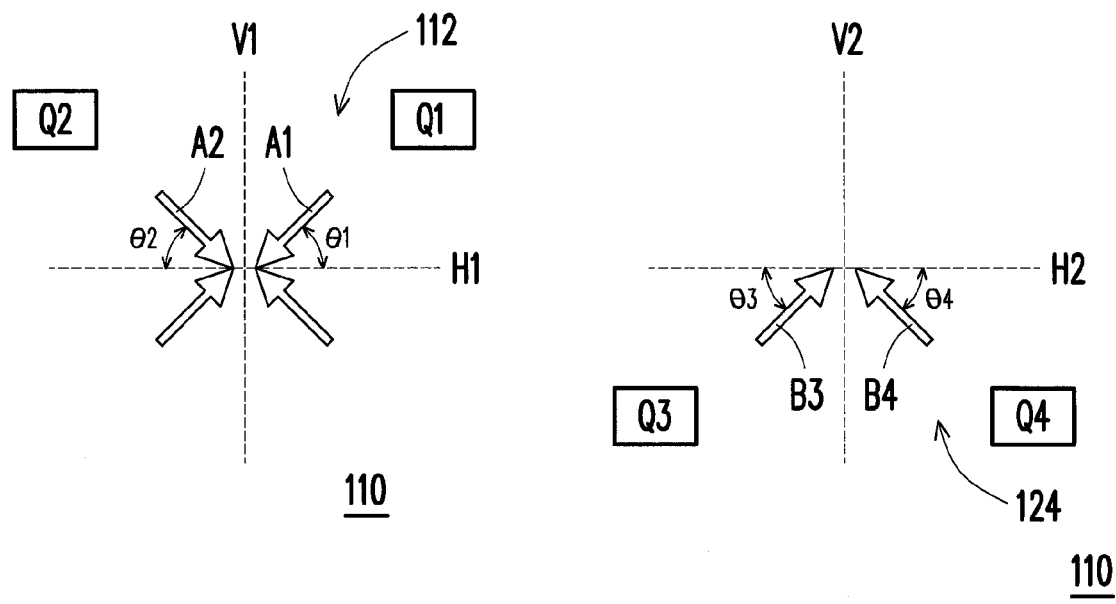
FIG. 14 illustrates the definition of an alignment direction angle according to an embodiment of the disclosure.
Figure 15:
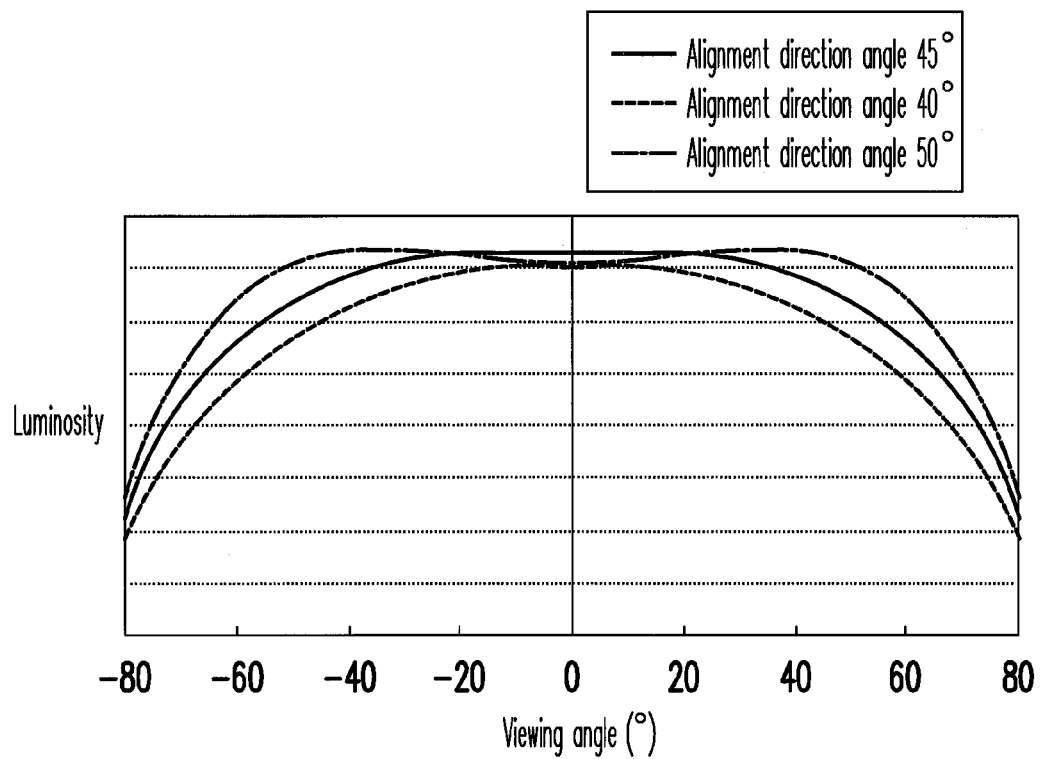
FIG. 15 illustrates the relationship between viewing angle and display luminosity with different alignment direction angles defined in FIG. 14.

FIG. 14 illustrates the definition of an alignment direction angle according to an embodiment of the disclosure. FIG. 15 illustrates the relationship between viewing angle and display luminosity with different alignment direction angles defined in FIG. 14.

As shown in FIG. 14, in the present embodiment, the angle formed by an alignment direction (for example, an alignment slit of a pixel electrode) and a substantially horizontal datum line is defined as an alignment direction angle. The alignment direction of the first pixel electrode area 110 and the second pixel electrode area 120 mentioned below is the alignment direction of one of the first pixel electrode area 110 and the second pixel electrode area 120 which takes a greater area and provides a greater contribution. To be specific, the first alignment area 112 of each first pixel electrode area 110 is divided by the first vertical datum line V1 into a first quadrant Q1 and a second quadrant Q2 which are mirror symmetric to each other, wherein the first alignment area 112 has a first alignment direction A1 in the first quadrant Q1, and the first alignment area 112 has a second alignment direction A2 in the second quadrant Q2. The first alignment direction A1 and the second alignment direction A2 respectively form a first angle θ1 and a first angle θ2 with the first horizontal datum line H1. Besides, the fourth alignment area 124 of each second pixel electrode area 120 is divided by the second vertical datum line V2 into a third quadrant Q3 and a fourth quadrant Q4 which are mirror symmetric to each other, wherein the fourth alignment area 124 has a third alignment direction B3 in the third quadrant Q3, and the fourth alignment area 124 has a fourth alignment direction B4 in the fourth quadrant Q4. The third alignment direction B3 and the fourth alignment direction B4 respectively form a second angle θ3 and a second angle θ4 with the second horizontal datum line H2.

Additionally, it can be observed in the characteristic curves illustrated in FIG. 15 that the alignment direction angle affects the display luminosity of a pixel, while the anti-peep contrast is related to display luminosity. Accordingly, in the disclosure, the anti-peep contrast can be improved by adjusting the alignment direction angles of the first pixel electrode area 110 and the second pixel electrode area 120.

As shown in FIG. 15, when the alignment direction angle is not 45°, the front view transmissive luminosity is affected. Thus, variation in small angle range will be described below in order to not affect the front view transmissive luminosity too much. As shown in FIG. 15, when the alignment direction angle is substantially smaller than 45° (for example, about 40°), the horizontal side view luminosity is lower than that when the alignment direction angle is about 45°. On the other hand, if the alignment direction angle is increased to about 50°, the horizontal side view luminosity is substantially higher than that when the alignment direction angle is about 45°. For example, with a grayscale of 192, the contrast of horizontal side view luminosity between the second region and first region is increased for about 25%.

Thereby, based on the characteristic illustrated in FIG. 15, the anti-peep contrast achieved when the alignment direction angles θ3 and θ4 of the second pixel electrode areas are both about 40° and the alignment direction angles θ1 and θ2 of the first pixel electrode areas are both about 50°, is greatly improved than that when the alignment direction angles θ1, θ2, θ3, and θ4 of the first pixel electrode areas and the second pixel electrode areas are all about 45°. Accordingly, in the present embodiment, the range of the alignment direction angles θ1 and θ2 of the first pixel electrode area are set to be greater than or equal to about 45°, range of the alignment direction angle θ3 and θ4 of the second pixel electrode area are set to be greater than or equal to about 45°, and the first angles θ1 and θ2 and the second angles θ3 and θ4 are not equal to about 45° at the same time, so that the anti-peep contrast can be further improved.

The Resolution of Color Washout in the Wide Viewing Angle Display Mode

Due to the asymmetric viewing angle distribution caused by the asymmetric liquid crystal alignment of the pixel structure described above, in the disclosure, the color washout problem in a LCD panel in the wide viewing angle display mode can be resolved through the asymmetric liquid crystal alignment in the vertical direction. When the LCD panel is in the wide viewing angle display mode, the first pixel electrode area and the second pixel electrode area are driven individually, and the color washout problem can be resolved by adjusting the ratio of the area of the first pixel electrode area to the area of the second pixel electrode area or the ratio of areas of alignment areas in each pixel electrode area.

Following description is based on the pixel design illustrated in FIG. 11A. In the embodiment described above, in order to maintain a good front view display quality, substantially the same driving voltage is supplied to each first pixel electrode area 110 and each second pixel electrode area 120 when the same front view luminosity is displayed. However, in the present embodiment, by taking the color washout problem which may be produced in the wide viewing angle display mode at side viewing angles, as shown in FIG. 16A, the d driving voltage of the first pixel electrode area 110 of each sub-pixel 100a is substantially lower than that of the second pixel electrode area 120. Thereby, the color washout problem in the upper plane viewing angle direction of the entire pixel electrode area can be resolved. Contrarily, to resolve the color washout problem in the lower half plane viewing angle direction of the entire pixel electrode area, as shown in FIG. 16B, the driving voltage of the second pixel electrode area 120 of each sub-pixel 100a is substantially lower than that of the first pixel electrode area 110.

Figure 17A:
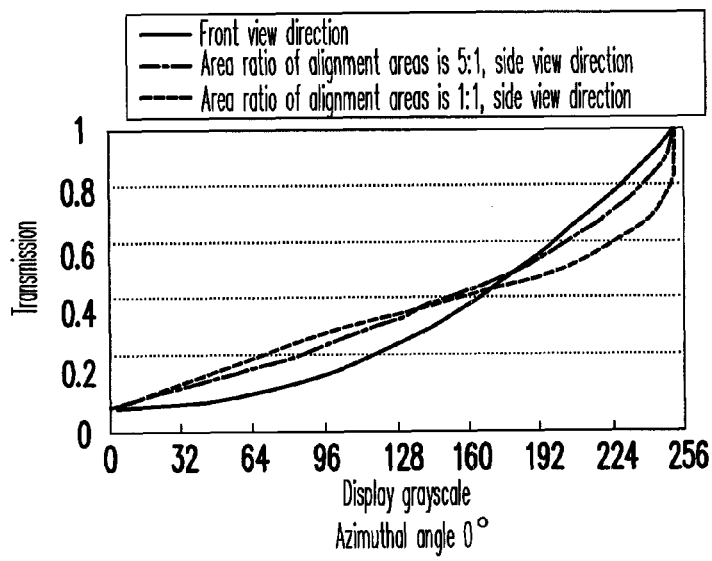
FIGS. 17A-17C illustrate the relationship between display grayscale and transmission of a LCD panel at different azimuthal angles in a wide viewing angle display mode.
Figure 17B:
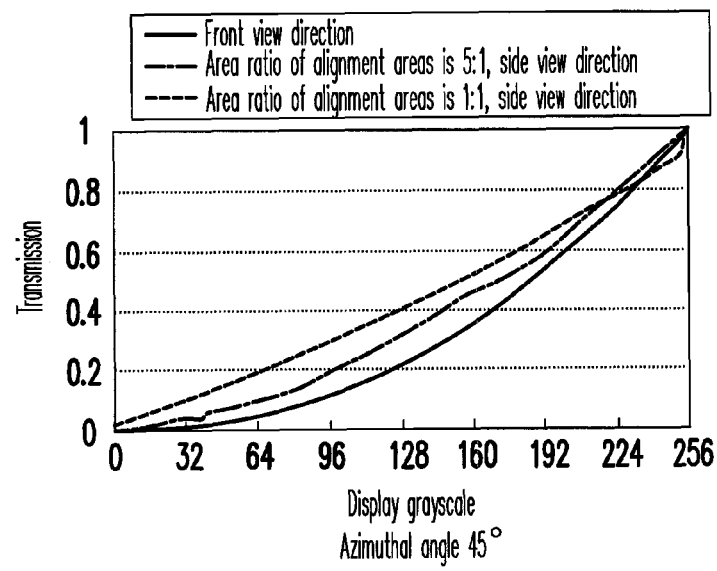
Figure 17C:
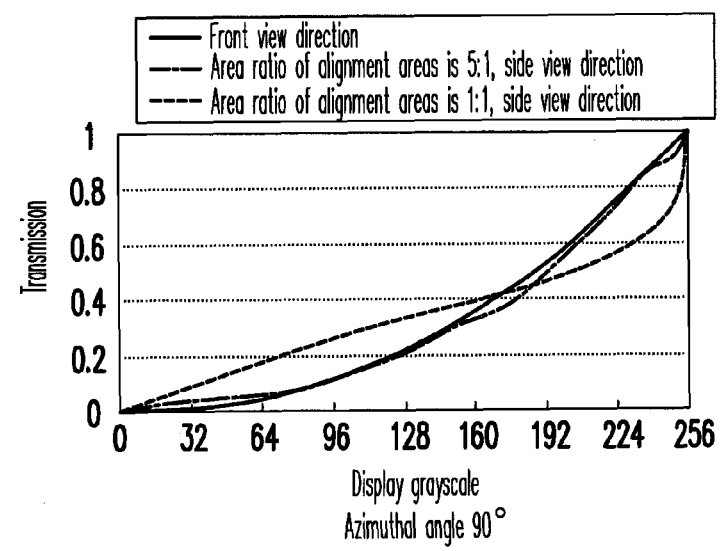

FIGS. 17A-17C illustrate the relationship between display grayscale and transmission. Referring to FIGS. 17A-17C, an area ratio about 1:1 of alignment areas is obtained when the first pixel electrode area 110 and the second pixel electrode area 120 are driven with the same voltage (i.e., the driving method in the wide viewing angle display mode in the embodiment described above). However, in the present embodiment, by taking the anti-peep effect into consideration, the area ratio of the fourth alignment area 124 and the third alignment area 122 in the second pixel electrode area 120 is substantially greater than or equal to about 5:1, and the voltage of the second pixel electrode area 120 is always higher than that of the first pixel electrode area 110, so that the color washout problem can be effectively improved. Namely, the difference between side view grayscale and luminosity and front view grayscale and luminosity is very small. Accordingly, as shown in FIGS. 17A-17C, the color washout problem can be effectively resolved in the upper half plane with the azimuthal angles at about 0°, about 45°, and about 90° contributed by the second pixel electrode area 120.

Additionally, referring to foregoing description of "the improve of front view display quality in the narrow viewing angle display mode", in the pixel design adopted in FIGS. 17A-17C, the first pixel electrode area 110 and the second pixel electrode area 120 of each sub-pixel 100a have substantially the same area (i.e., the area ratio is about 5:5 or about 4:6) so as to achieve a good anti-peep effect and a good front view display quality.

However, if the anti-peep effect is not considered, in the disclosure, the area ratio of the first pixel electrode area 110 and the second pixel electrode area 120 in each sub-pixel 100a may be adjusted according to the area ratio of alignment areas in each pixel electrode area to further resolve the color washout problem at side viewing angles.

For example, the area ratio of the first pixel electrode area 110 and the second pixel electrode area 120 of each sub-pixel 100a may be about 6:4, the area ratio of the first alignment area 112 and the second alignment area 114 in each first pixel electrode area 110 may be about 3:1, and the area ratio of the third alignment area 122 and the fourth alignment area 124 in each second pixel electrode area 120 may be about 1:3.

Or, the area ratio of the first pixel electrode area 110 and the second pixel electrode area 120 in each sub-pixel 100a may be about 7:3, the area ratio of the first alignment area 112 and the second alignment area 114 in each first pixel electrode area 110 may be about 1:1, and the area ratio of the third alignment area 122 and the fourth alignment area 124 in each second pixel electrode area 120 may be about 1:3.

Both foregoing two pixel designs can effectively resolve the color washout problem in the LCD panel 100 at side viewing angles. However, the disclosure is not limited to foregoing two pixel designs.

The Improvement of Transmission in the Narrow Viewing Angle Display Mode

In the narrow viewing angle display mode, the first pixel electrode area 110 and the second pixel electrode area 120 have an area ratio of about 5:5. The front view luminosities of the first region 102 and the second region 104 have to be the same in the narrow viewing angle display mode. Taking the first region 102 as an example, the front view luminosity proportion of the first pixel electrode areas 110 and the second pixel electrode areas 120 in the first region 102 is designed to be about 0:10 (i.e., the actual luminosity is about 50% of the luminosity when the first pixel electrode area 110 and the second pixel electrode area 120 are both enabled (or namely turned on)). Thus, the area ratio of the first pixel electrode area 110 and the second pixel electrode area 120 is changed from about 5:5 to substantially between 5:5 and 2:8 (for example, about 4:6, or about 3:7). For example, if the area ratio is about 4:6, the maximum luminosity in the narrow viewing angle display mode may be about 60% of the original luminosity. However, based on the alignment design described above (for example, the area ratio of the first alignment area 112 and the second alignment area 114 in the first pixel electrode area 110 is about 5:1, and the area ratio of the third alignment area 122 and the fourth alignment area 124 in the second pixel electrode area 120 is about 1:5), even though a good anti-peep effect and a good front view display luminosity are achieved in the narrow viewing angle display mode, the color washout problem cannot be effectively resolved in the wide viewing angle display mode.

Thereby, in the present embodiment, both an optimal anti-peep effect and a good front view display luminosity are to be achieved in the narrow viewing angle display mode, and the color washout problem should be effectively resolved in the wide viewing angle display mode. To be specific, first, in order to increase the transmissive luminosity in the narrow viewing angle display mode, the area ratio of the first pixel electrode area 110 and the second pixel electrode area 120 is set to substantially between 5:5 and 0:10 (for example, about 4:6 or about 3:7). In this case, in order to maintain the original anti-peep effect, the alignment proportion of the third alignment area 122 and the fourth alignment area 124 in the second pixel electrode area 120 should be substantially between 1:5 and 0:10. To resolve the color washout problem in the wide viewing angle display mode, the alignment proportion of the third alignment area 122 and the fourth alignment area 124 in the second pixel electrode area 120 is set to about 1:5, and the alignment proportion of the first alignment area 122 and the second alignment area 124 in the first pixel electrode area 110 can be set to about 10:0 according to the alignment proportion of the second pixel electrode area 120. Thereby, all of aforementioned advantages can be achieved.

Moreover, in the embodiments described above, the driving liquid crystal electric field of the LCD panel is preferably a vertical electric field. However, the disclosure is not limited thereto. In the embodiments described above, it is assumed that each pixel is composed of a red, a green, and a blue sub-pixel. However, according to the disclosure, each pixel may also be composed of three, four, five, six, or more sub-pixels, and each sub-pixel may adopt one of aforementioned designs. The light displayed by a pixel may be white light, warm white light, or cold white light. In order to obtain aforementioned light color, the colors of the sub-pixels should be selected from the color palette, as described in foregoing embodiments.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A liquid crystal display (LCD) panel, comprising:
   at least one first region and at least one second region, wherein the first region and the second region respectively have a plurality of sub-pixels, and each of the sub-pixels comprises:
      at least one first pixel electrode area, divided by a first horizontal datum line and a first vertical datum line into a plurality of first alignment sub-areas, wherein each of the first alignment sub-areas has a liquid crystal alignment, and the liquid crystal alignments of the first alignment sub-areas are different from each other; and
      at least one second pixel electrode area, divided by a second horizontal datum line and a second vertical datum line into a plurality of second alignment sub-areas, wherein each of the second alignment sub-areas has a liquid crystal alignment, the liquid crystal alignments of the second alignment sub-areas are different from each other, and the second horizontal datum line divides the second pixel electrode area into a first alignment area and a second alignment area having different sizes; and
   when the LCD panel is in a narrow viewing angle display mode, a driving voltage of the first pixel electrode areas within the first region is lower than driving voltages of the second pixel electrode areas within the first region and the first pixel electrode areas and the second pixel electrode areas within the second region, and the driving voltage of the second pixel electrode areas within the first region when a first front view luminosity is displayed is substantially higher than the driving voltages of the first pixel electrode areas and the second pixel electrode areas within the second region when the first front view luminosity is displayed.

2. The LCD panel according to claim 1, wherein the first horizontal datum line divides the first pixel electrode area into a third alignment area and a fourth alignment area having different sizes.

3. The LCD panel according to claim 2, wherein the third alignment area has a quantity of a first alignment along the first vertical datum line, and the fourth alignment area has a quantity of a second alignment along the first vertical datum line, wherein directions of the quantity of the first alignment and the quantity of the second alignment are reverse to each other, and the quantity of the first alignment is greater than the quantity of the second alignment; and
   the first alignment area has a quantity of a third alignment along the second vertical datum line, and the second alignment area has a quantity of a fourth alignment along the second vertical datum line, wherein directions of the quantity of the third alignment and the quantity of the fourth alignment are reverse to each other, the directions of the quantity of the third alignment and the quantity of the first alignment are the same, and the quantity of the third alignment is smaller than the quantity of the fourth alignment.

4. The LCD panel according to claim 1, wherein the first pixel electrode area and the second pixel electrode area of each of the sub-pixels are arranged along a vertical direction, and the first pixel electrode areas and the second pixel electrode areas of any adjacent two of the sub-pixels in a horizontal direction are arranged in reverse directions.

5. The LCD panel according to claim 1, wherein a front view luminosity proportion of the first pixel electrode area of each of the sub-pixels within the second region is substantially greater than or equal to a front view luminosity proportion of the second pixel electrode area of the same sub-pixel.

6. The LCD panel according to claim 5, wherein a ratio of a front view luminosity proportion of the first pixel electrode area of each of the sub-pixels within the second region to a front view luminosity proportion of the second pixel electrode area of the same sub-pixel is substantially greater than or equal to 1.

7. The LCD panel according to claim 5, wherein a ratio of a front view luminosity proportion of the first pixel electrode area of each of the sub-pixels within the second region to a front view luminosity proportion of the second pixel electrode area of the same sub-pixel is a constant value.

8. The LCD panel according to claim 1, wherein the first pixel electrode area and the second pixel electrode area of each of the sub-pixels within the second region have a first front view luminosity proportion at a first display grayscale, the first front view luminosity proportion is substantially between 5:5 and 0:10, the first pixel electrode area and the second pixel electrode area of the same sub-pixel have a second front view luminosity proportion at a second display grayscale, and the second front view luminosity proportion is substantially between 5:5 and 0:10, wherein the first display grayscale is not equal to the second display grayscale, and the first front view luminosity proportion is not equal to the second front view luminosity proportion.

9. The LCD panel according to claim 8, wherein the sub-pixels comprise a first color sub-pixel and a second color sub-pixel in different colors, and a front view luminosity proportion of the first color sub-pixel is not equal to a front view luminosity proportion of the second color sub-pixel.

10. The LCD panel according to claim 1, wherein when the LCD panel is in a wide viewing angle display mode, the driving voltage of the first pixel electrode areas is substantially the same as the driving voltage of the second pixel electrode areas when a same front view luminosity is displayed.

11. The LCD panel according to claim 1, wherein when the LCD panel is in a wide viewing angle display mode, the driving voltage of the first pixel electrode area of each of the sub-pixels is substantially lower than the driving voltage of the second pixel electrode area of the same sub-pixel.

12. The LCD panel according to claim 11, wherein a ratio of an area of the second alignment area of each of the second pixel electrode areas to an area of the first alignment area of the second pixel electrode area is substantially greater than or equal to 5.

13. The LCD panel according to claim 12, wherein an area of the first pixel electrode area of each of the sub-pixels is substantially equal to an area of the second pixel electrode area of the sub-pixel.

14. The LCD panel according to claim 12, wherein an area of the first pixel electrode area of each of the sub-pixels is not equal to an area of the second pixel electrode area of the sub-pixel.

15. The LCD panel according to claim 2, wherein a ratio of an area of the first pixel electrode area of each of the sub-pixels to an area of the second pixel electrode area of the sub-pixel is substantially between 5:5 and 2:8, a ratio of an area of the third alignment area of each of the first pixel electrode areas to an area of the fourth alignment area of the first pixel electrode area is substantially between 5:1 and 10:0, and a ratio of an area of the first alignment area of each of the second pixel electrode areas to an area of the second alignment area of the second pixel electrode area is substantially between 1:5 and 0:10.

16. The LCD panel according to claim 2, wherein a ratio of an area of the first pixel electrode area of each of the sub-pixels to an area of second pixel electrode area of the sub-pixel is about 4:6, a ratio of an area of the third alignment area of each of the first pixel electrode areas to an area of the fourth alignment area of the first pixel electrode area is about 10:0, and a ratio of an area of the first alignment area of each of the second pixel electrode areas to an area of the second alignment area of the second pixel electrode area is about 1:5.

17. The LCD panel according to claim 2, wherein the third alignment area of each of the first pixel electrode areas is divided by the first vertical datum line into a first quadrant and a second quadrant which are mirror symmetric to each other, the third alignment area has a first alignment direction within the first quadrant, the third alignment area has a second alignment direction within the second quadrant, the first alignment direction and the second alignment direction respectively form a first angle with the first horizontal datum line, and the first angle is greater than or equal to about 45°.

18. The LCD panel according to claim 17, wherein the second alignment area of each of the second pixel electrode areas is divided by the second vertical datum line into a third quadrant and a fourth quadrant which are mirror symmetric to each other, the second alignment area has a third alignment direction within the third quadrant, the second alignment area has a fourth alignment direction within the fourth quadrant, the third alignment direction and the fourth alignment direction respectively form a second angle with the second horizontal datum line, the second angle is smaller than or equal to about 45°, and the first angle is not equal to the second angle.

19. The LCD panel according to claim 1, wherein the second alignment area of each of the second pixel electrode areas is divided by the second vertical datum line into a third quadrant and a fourth quadrant which are mirror symmetric to each other, the second alignment area has a third alignment direction within the third quadrant, the second alignment area has a fourth alignment direction within the fourth quadrant, the third alignment direction and the fourth alignment direction respectively form a second angle with the second horizontal datum line, and the second angle is smaller than or equal to about 45°.

20. A LCD panel, comprising:
a plurality of sub-pixels, wherein each of the sub-pixels comprises at least a first pixel electrode area and a second pixel electrode area, wherein
the second pixel electrode area has at least one liquid crystal alignment direction, a sum quantity of the liquid crystal alignment direction causes a luminous flux in an upper half viewing angle direction to be different from a luminous flux in a lower half viewing angle direction, and a driving voltage of the first pixel electrode areas is substantially lower than a driving voltage of the second pixel electrode areas.

21. The LCD panel according to claim 20, wherein a ratio of an area of the first pixel electrode area of each of the sub-pixels to an area of the second pixel electrode area of the sub-pixel is about 6:4, a ratio of an area of a first alignment area of each of the first pixel electrode areas to an area of a second alignment area of the first pixel electrode area is about 3:1, and a ratio of an area of a third alignment area of each of the second pixel electrode areas to an area of a fourth alignment area of the second pixel electrode area is about 1:3.

22. The LCD panel according to claim 20, wherein a ratio of an area of the first pixel electrode area of each of the sub-pixels to an area of the second pixel electrode area of the sub-pixel is about 7:3, a ratio of an area of a first alignment area of each of the first pixel electrode areas to an area of a second alignment area of the first pixel electrode area is about 1:1, and a ratio of an area of a third alignment area of each of the second pixel electrode areas to an area of a fourth alignment area of the second pixel electrode area is about 1:3.

23. A LCD panel, comprising:
at least one first region and at least one second region, wherein the first region and the second region respectively have a plurality of sub-pixels, and each of the sub-pixels comprises at least a first pixel electrode area and a second pixel electrode area, wherein
the first pixel electrode area or the second pixel electrode area has at least one liquid crystal alignment direction, and a sum quantity of the liquid crystal alignment direction causes a luminous flux in an upper half viewing angle direction to be different from a luminous flux in a lower half viewing angle direction;
when the LCD panel is in a narrow viewing angle display mode, a driving voltage of the first pixel electrode areas within the first region when a first front view luminosity is displayed is substantially lower than driving voltages of the second pixel electrode areas within the first region and the first pixel electrode areas and the second pixel electrode areas within the second region when the first front view luminosity is displayed, and the driving voltage of the second pixel electrode areas within the first region when the first front view luminosity is displayed is substantially higher than the driving voltages of the first pixel electrode areas and the second pixel electrode areas within the second region when the first front view luminosity is displayed.

24. The LCD panel according to claim 23, wherein the first pixel electrode area has a quantity of a first alignment and a quantity of a second alignment along a first vertical datum line, wherein directions of the quantity of the first alignment and the quantity of the second alignment are reverse to each other, and the quantity of the first alignment is substantially greater than the quantity of the second alignment; and
the second pixel electrode area has a quantity of a third alignment and a quantity of a fourth alignment along a second vertical datum line, wherein directions of the quantity of the third alignment and the quantity of the fourth alignment are reverse to each other, the directions of the quantity of the third alignment and the quantity of the first alignment are the same, and the quantity of the third alignment is smaller than the quantity of the fourth alignment.

25. The LCD panel according to claim 23, wherein the first pixel electrode area and the second pixel electrode area of each of the sub-pixels are arranged along a vertical direction, and the first pixel electrode areas and the second pixel electrode areas of any adjacent two of the sub-pixels in a horizontal direction are arranged in reverse directions.

26. The LCD panel according to claim 23, wherein a front view luminosity proportion of the first pixel electrode area of each of the sub-pixels within the second region is substantially greater than or equal to a front view luminosity proportion of the second pixel electrode area of the same sub-pixel.

27. The LCD panel according to claim 26, wherein a ratio of a front view luminosity proportion of the first pixel electrode area of each of the sub-pixels within the second region to a front view luminosity proportion of the second pixel electrode area of the same sub-pixel is substantially greater than or equal to 1.

28. The LCD panel according to claim 26, wherein a ratio of a front view luminosity proportion of the first pixel electrode area of each of the sub-pixels within the second region to a front view luminosity proportion of the second pixel electrode area of the same sub-pixel is a constant value.

29. The LCD panel according to claim 23, wherein the first pixel electrode area and the second pixel electrode area of each of the sub-pixels within the second region have a first front view luminosity proportion at a first display grayscale, the first front view luminosity proportion is substantially between 5:5 and 0:10, the first pixel electrode area and the second pixel electrode area of the same sub-pixel have a second front view luminosity proportion at a second display grayscale, and the second front view luminosity proportion is substantially between 5:5 and 0:10, wherein the first display grayscale is not equal to the second display grayscale, and the first front view luminosity proportion is not equal to the second front view luminosity proportion.

30. The LCD panel according to claim 29, wherein the sub-pixels comprise a first color sub-pixel and a second color sub-pixel in different colors, and a front view luminosity proportion of the first color sub-pixel is not equal to a front view luminosity proportion of the second color sub-pixel.

31. The LCD panel according to claim 23, wherein when the LCD panel is in a wide viewing angle display mode, the driving voltage of the first pixel electrode areas is substantially the same as the driving voltage of the second pixel electrode areas when a same front view luminosity is displayed.

32. The LCD panel according to claim 23, wherein when the LCD panel is in a wide viewing angle display mode, the driving voltage of the first pixel electrode area of each of the sub-pixels is substantially lower than the driving voltage of the second pixel electrode area of the same sub-pixel.

33. The LCD panel according to claim 23, wherein each of the second pixel electrode areas has a first alignment area and a second alignment area for respectively providing the quantity of the third alignment and the quantity of the fourth alignment, and a ratio of an area of the second alignment area to an area of the first alignment area is substantially greater than or equal to 5.

34. The LCD panel according to claim 33, wherein an area of the first pixel electrode area of each of the sub-pixels is substantially equal to an area of the second pixel electrode area of the sub-pixel.

35. The LCD panel according to claim 33, wherein an area of the first pixel electrode area of each of the sub-pixels is not equal to an area of the second pixel electrode area of the sub-pixel.

36. The LCD panel according to claim 23, wherein a ratio of an area of the first pixel electrode area of each of the sub-pixels to an area of the second pixel electrode area of the sub-pixel is at least between about 5:5 and 2:8, each of the first pixel electrode areas has a first alignment area and a second alignment area for respectively providing the quantity of the first alignment and the quantity of the second alignment, a ratio of an area of the first alignment area to an area of the second alignment area is substantially between 5:1 and 10:0, and a ratio of an area of the third alignment area of each of the second pixel electrode areas to an area of the fourth alignment area of the second pixel electrode area is substantially between 1:5 and 0:10.

37. The LCD panel according to claim 23, wherein a ratio of an area of the first pixel electrode area of each of the sub-pixels to an area of the second pixel electrode area of the sub-pixel is about 4:6, each of the first pixel electrode areas has a first alignment area and a second alignment area for respectively providing the quantity of the first alignment and the quantity of the second alignment, a ratio of an area of the first alignment area to an area of the second alignment area is about 10:0, and a ratio of an area of the third alignment area of each of the second pixel electrode areas to an area of the fourth alignment area of the second pixel electrode area is about 1:5.

38. The LCD panel according to claim 23, wherein each of the first pixel electrode areas has a first alignment area and a second alignment area for respectively providing the quantity of the first alignment and the quantity of the second alignment, the first alignment area of each of the first pixel electrode areas is divided by the first vertical datum line into first quadrant and a second quadrant which are mirror symmetric to each other, the first alignment area has a first alignment direction within the first quadrant, the first alignment area has a second alignment direction within the second quadrant, the first alignment direction and the second alignment direction respectively form a first angle with the first horizontal datum line, and the first angle is greater than or equal to about 45°.

39. The LCD panel according to claim 38, wherein each of the second pixel electrode areas has a third alignment area and a fourth alignment area for respectively providing the quantity of the third alignment and the quantity of the fourth alignment, the fourth alignment area of each of the second pixel electrode areas is divided by the second vertical datum line into third quadrant and a fourth quadrant which are mirror symmetric to each other, the second alignment area has a third alignment direction within the third quadrant, the second alignment area has a fourth alignment direction within the fourth quadrant, the third alignment direction and the fourth alignment direction respectively form a second angle with the second horizontal datum line, the second angle is smaller than or equal to about 45°, and the first angle is not equal to the second angle.

40. The LCD panel according to claim 23, wherein each of the second pixel electrode areas has a first alignment area and a second alignment area for respectively providing the quantity of the third alignment and the quantity of the fourth alignment, the second alignment area of each of the second pixel electrode areas is divided by the second vertical datum line into a third quadrant and a fourth quadrant which are mirror symmetric to each other, the second alignment area has a third alignment direction within the third quadrant, the second alignment area has a fourth alignment direction within the fourth quadrant, the third alignment direction and the fourth alignment direction respectively form a second angle with the second horizontal datum line, and the second angle is smaller than or equal to about 45°.

\* \* \* \* \*